(12) United States Patent
Kita

(10) Patent No.: US 12,520,194 B2
(45) Date of Patent: Jan. 6, 2026

(54) EXECUTING APPROPRIATE SCALE-OUT OF AN ELEMENT INCLUDED IN A COMMUNICATION SYSTEM

(71) Applicant: RAKUTEN MOBILE, INC., Tokyo (JP)

(72) Inventor: Shinya Kita, Tokyo (JP)

(73) Assignee: RAKUTEN MOBILE, INC., Tokyo (JP)

(*) Notice: Subject to any disclaimer, the term of this patent is extended or adjusted under 35 U.S.C. 154(b) by 351 days.

(21) Appl. No.: 18/261,826

(22) PCT Filed: Jun. 29, 2022

(86) PCT No.: PCT/JP2022/026070
§ 371 (c)(1),
(2) Date: Jul. 17, 2023

(87) PCT Pub. No.: WO2024/004103
PCT Pub. Date: Jan. 4, 2024

(65) Prior Publication Data
US 2024/0414591 A1    Dec. 12, 2024

(51) Int. Cl.
*H04W 28/08* (2023.01)
*H04W 72/52* (2023.01)

(52) U.S. Cl.
CPC ....... *H04W 28/0908* (2020.05); *H04W 72/52* (2023.01)

(58) Field of Classification Search
CPC ............. H04W 28/0908; H04W 72/52; H04W 16/08; H04L 47/127

(Continued)

(56) References Cited

U.S. PATENT DOCUMENTS 7,843,828 B2 * 11/2010 Key ........................ H04L 47/10
370/252
11,252,090 B1 * 2/2022 Doddegowda ........ H04L 47/125
(Continued)

FOREIGN PATENT DOCUMENTS

JP    2011258119 A    12/2011
JP    2016220126 A    12/2016
(Continued)

OTHER PUBLICATIONS

International Search Report in PCT Application No. PCT/JP2022/026070, mailed Oct. 4, 2022, 3pp.

*Primary Examiner* — Robert J Lopata
(74) *Attorney, Agent, or Firm* — HAUPTMAN HAM, LLP

(57) ABSTRACT

It is enabled that an element included in a communication system is appropriately scaled out. An AI (70) predicts, based on a performance index value before a given reference time point relating to a communication system, a network load in a prediction period from the given reference time point until a predetermined time after the given reference time point. A policy manager (90) determines, in response to the prediction, whether a magnitude of a predicted value of the network load in the prediction period satisfies a given condition. The policy manager (90), a life cycle manager (94), a container manager (78), and a configuration manager (76) execute scale-out of an element included in the communication system when, in the determinations for two or more prediction periods which have different reference time points but at least partially overlap, a predetermined number or more of the determinations are a determination that the condition is satisfied.

12 Claims, 25 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2014/0185581 A1 | 7/2014 | Senarath et al. | |
| 2017/0344365 A1 | 11/2017 | Nakamoto et al. | |
| 2018/0063219 A1* | 3/2018 | Ljung | H04N 21/64738 |
| 2019/0150027 A1* | 5/2019 | Ner | H04L 47/127 |
| | | | 370/235 |
| 2019/0253930 A1* | 8/2019 | Senju | H04W 24/08 |
| 2021/0297878 A1* | 9/2021 | Mondragon | G06N 3/08 |
| 2021/0352517 A1* | 11/2021 | Wang | H04B 7/0413 |
| 2022/0385579 A1* | 12/2022 | Rangel Augusto | H04L 47/125 |
| 2023/0421472 A1* | 12/2023 | Mathew | H04L 41/0806 |
| 2024/0064105 A1* | 2/2024 | Sharma | H04L 47/24 |

FOREIGN PATENT DOCUMENTS

| | | | |
|---|---|---|---|
| JP | 2017211928 A | 11/2017 | |
| WO | 2011155233 A1 | 12/2011 | |
| WO | 2018016043 A1 | 1/2018 | |

* cited by examiner

EXECUTING APPROPRIATE SCALE-OUT OF AN ELEMENT INCLUDED IN A COMMUNICATION SYSTEM

RELATED APPLICATIONS

The present application is a National Phase of International Application Number PCT/JP2022/026070, filed Jun. 29, 2022.

TECHNICAL FIELD

The present invention relates to executing appropriate scale-out of an element included in a communication system.

BACKGROUND ART

In Patent Literature 1, there is described a system in which a usage bandwidth of each network process function of a communication device is acquired, and the number of network software executors to be used for network processes is increased when the bandwidth is greater than a scale-out threshold value.

CITATION LIST

Patent Literature

[Patent Literature 1] JP 2016-220126 A

SUMMARY OF INVENTION

Technical Problem

In order to scale out elements included in a communication system as described in Patent Literature 1 in a timely manner, it is conceivable to execute scale-out based on a network load prediction result.

In such a case, when it is predicted that the network load is to increase based on a low-accuracy prediction, the network load may increase at an earlier timing than the prediction. In consideration of that risk, it is conceivable to execute scale-out early in order to have a safety margin.

However, on the other hand, because the prediction accuracy is low, it is highly likely that the network load is not going to actually increase as much as predicted, and in that case, it is better not to execute scale-out.

The present invention has been made in view of the above-mentioned circumstances, and has an object to enable an element included in a communication system to be appropriately scaled out.

Solution to Problem

In order to solve the above-mentioned problem, according to one embodiment of the present disclosure, there is provided a scale-out execution system including: prediction means for predicting, based on a performance index value before a given reference time point relating to a communication system, a network load in a prediction period from the given reference time point until a predetermined time after the given reference time point; determination means for determining, in response to the prediction, whether a magnitude of a predicted value of the network load in the prediction period satisfies a given condition; and scale-out execution means for executing scale-out of an element included in the communication system when, in the determinations for two or more prediction periods which have different reference time points but at least partially overlap, a predetermined number or more of the determinations are a determination that the given condition is satisfied.

Further, according to one embodiment of the present disclosure, there is provided a scale-out execution method including: predicting, based on a performance index value before a given reference time point relating to a communication system, a network load in a prediction period from the given reference time point until a predetermined time after the given reference time point; determining, in response to the prediction, whether a magnitude of a predicted value of the network load in the prediction period satisfies a given condition; and executing scale-out of an element included in the communication system when, in the determinations for two or more prediction periods which have different reference time points but at least partially overlap, a predetermined number or more of the determinations are a determination that the given condition is satisfied.

DESCRIPTION OF EMBODIMENTS

One embodiment of the present invention is now described in detail with reference to the drawings.

Figure 1:
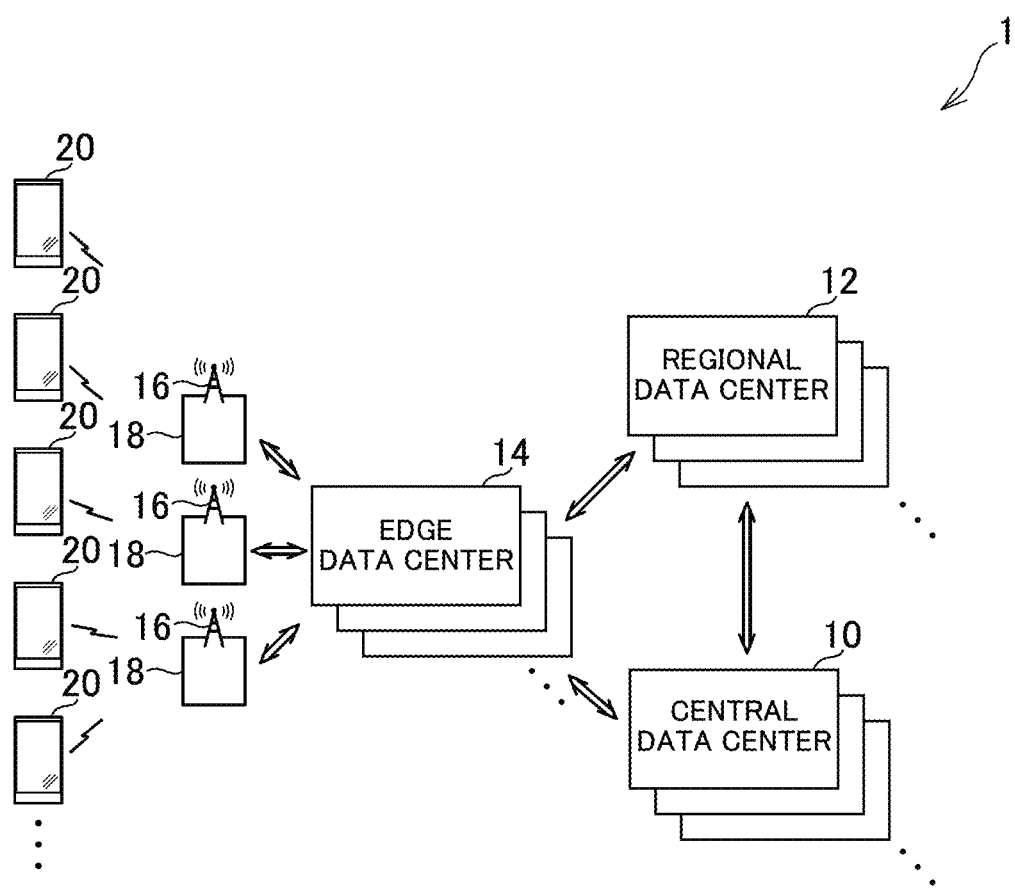
FIG. 1 is a diagram for illustrating an example of a communication system in one embodiment of the present invention.
Figure 2:
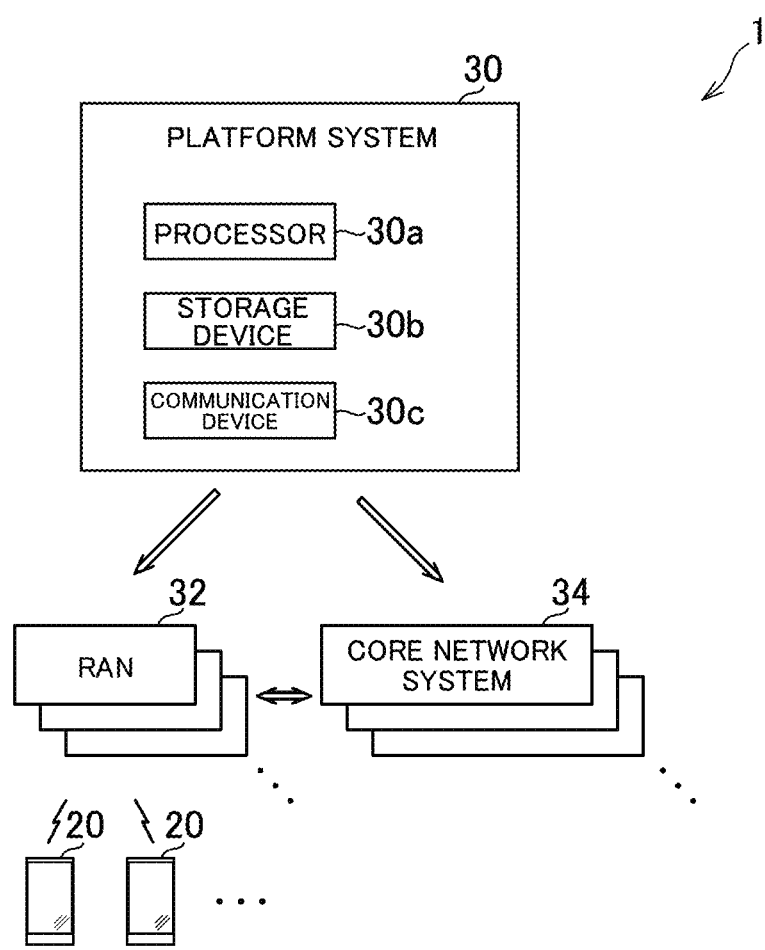
FIG. 2 is a diagram for illustrating an example of the communication system in the one embodiment of the present invention.

FIG. 1 and FIG. 2 are each a diagram for illustrating an example of a communication system 1 in the one embodiment of the present invention. FIG. 1 is an illustration drawn with attention being given to locations of a data center group included in the communication system 1. FIG. 2 is an illustration drawn with attention being given to various computer systems implemented in the data center group included in the communication system 1.

As illustrated in FIG. 1, the data center group included in the communication system 1 is classified into central data centers 10, regional data centers 12, and edge data centers 14.

For example, several central data centers 10 are dispersedly arranged in an area (for example, in Japan) covered by the communication system 1.

For example, tens of regional data centers 12 are dispersedly arranged in the area covered by the communication system 1. For example, when the area covered by the communication system 1 is the entire area of Japan, one or two regional data centers 12 may be arranged in each prefecture.

For example, thousands of edge data centers 14 are dispersedly arranged in the area covered by the communication system 1. In addition, each of the edge data centers 14 can communicate with a communication facility 18 provided with an antenna 16. In this case, as illustrated in FIG. 1, one edge data center 14 may be capable of communicating with several communication facilities 18. The communication facility 18 may include a computer such as a server computer. The communication facility 18 in this embodiment performs radio communication with a user equipment (UE) 20 via the antenna 16. The communication facility 18 provided with the antenna 16 is provided with, for example, a radio unit (RU), which is described later.

A plurality of servers are arranged in each of the central data centers 10, the regional data centers 12, and the edge data centers 14 in this embodiment.

In this embodiment, for example, the central data centers 10, the regional data centers 12, and the edge data centers 14 can communicate with one another. Communication can also be performed between the central data centers 10, between the regional data centers 12, and between the edge data centers 14. As illustrated in FIG. 2, the communication system 1 in this embodiment includes a platform system 30, a plurality of radio access networks (RANs) 32, a plurality of core network systems 34, and a plurality of UEs 20. The core network system 34, the RAN 32, and the UE 20 cooperate with each other to implement a mobile communication network.

The RAN 32 is a computer system, which is provided with the antenna 16, and corresponds to an eNodeB (eNB) in a fourth generation mobile communication system (hereinafter referred to as "4G") and an NR base station (gNB) in a fifth generation mobile communication system (hereinafter referred to as "5G"). The RANs 32 in this embodiment are implemented mainly by server groups arranged in the edge data centers 14 and the communication facilities 18. A part of the RAN 32 (for example, distributed unit (DU) or central unit (CU) or virtual distributed unit (vDU) or virtual central unit (vCU)) may be implemented by the central data center 10 or the regional data center 12 instead of the edge data center 14.

The core network system 34 is a system corresponding to an evolved packet core (EPC) in 4G or a 5G core (5GC) in 5G. The core network systems 34 in this embodiment are implemented mainly by server groups arranged in the central data centers 10 or the regional data centers 12.

The platform system 30 in this embodiment is configured, for example, on a cloud platform and includes a processor 30a, a storage device 30b, and a communication device 30c, as illustrated in FIG. 2. The processor 30a is a program control device such as a microprocessor which operates in accordance with a program installed in the platform system 30. The storage device 30b is, for example, a storage element such as a ROM or RAM, a solid state drive (SSD), a hard disk drive (HDD), or the like. The storage device 30b stores a program to be executed by the processor 30a, and the like. The communication device 30c is, for example, a communication interface such as a network interface controller (NIC) or a wireless local area network (LAN) module. Software-defined networking (SDN) may be implemented in the communication device 30c. The communication device 30c exchanges data with the RAN 32 and the core network system 34.

In this embodiment, the platform system 30 is implemented by a server group arranged in the central data center 10. The platform system 30 may be implemented by a server group arranged in the regional data center 12.

In this embodiment, for example, in response to a purchase request for a network service (NS) by a purchaser, the network service for which the purchase request has been made is constructed in the RAN 32 or the core network system 34. Then, the constructed network service is provided to the purchaser.

For example, a network service, such as a voice communication service, a data communication service, or the like, is provided to the purchaser who is a mobile virtual network operator (MVNO). The voice communication service or the data communication service provided in this embodiment is eventually provided to a customer (end user) for the purchaser (MVNO in the above-mentioned example), who uses the UE 20 illustrated in FIG. 1 and FIG. 2. The end user can perform voice communication or data communication with other users via the RAN 32 or the core network system 34. The UE 20 of the end user can also access a data network such as the Internet via the RAN 32 or the core network system 34.

In addition, in this embodiment, an Internet of things (IoT) service may be provided to an end user who uses a robot arm, a connected car, or the like. In this case, an end user who uses, for example, a robot arm, a connected car, or the like may be a purchaser of the network service in this embodiment.

In this embodiment, a container-type virtualized application execution environment such as Docker (trademark) is installed in the servers arranged in the central data center 10, the regional data center 12, and the edge data center 14, and containers can be deployed in those servers and operated. In those servers, a cluster formed of one or more containers generated by such a virtualization technology may be constructed. For example, a Kubernetes cluster managed by a container management tool such as Kubernetes (trademark) may be constructed. Then, a processor on the constructed cluster may execute a container-type application.

The network service provided to the purchaser in this embodiment is formed of one or a plurality of functional units (for example, network function (NF)). In this embodiment, the functional unit is implemented by the NF implemented by the virtualization technology. The NF implemented by the virtualization technology is called "virtualized network function (VNF)." It does not matter what kind of virtualization technology has been used for virtualization. For example, a containerized network function (CNF) implemented by a container-type virtualization technology is also included in the VNF in this description. This embodiment is described on the assumption that the network service is implemented by one or a plurality of CNFs. The functional unit in this embodiment may also correspond to a network node.

Figure 3:
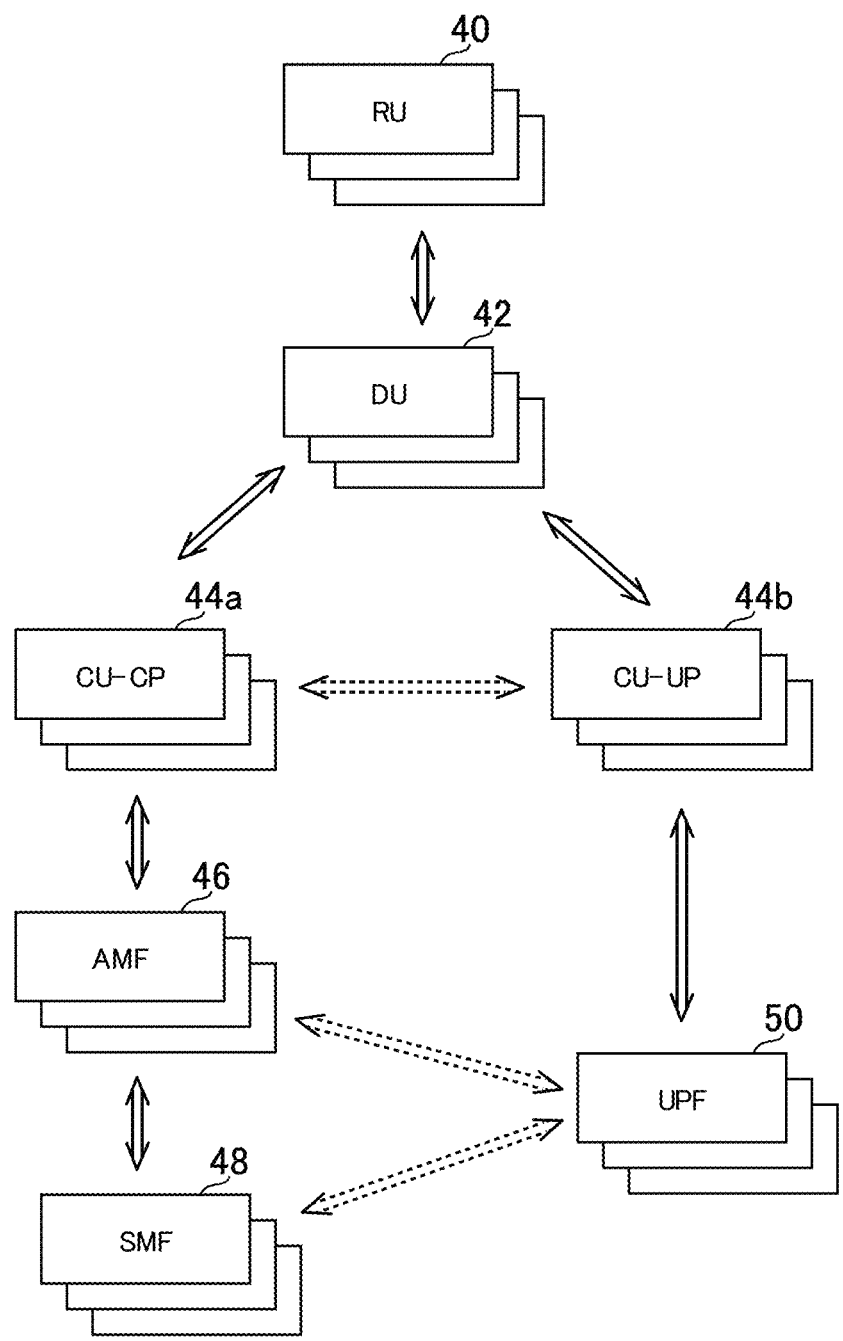
FIG. 3 is a diagram for schematically illustrating an example of a network service in the one embodiment of the present invention.

FIG. 3 is a diagram for schematically illustrating an example of an operating network service. The network service illustrated in FIG. 3 includes NFs, such as a plurality of RUs 40, a plurality of DUs 42, a plurality of CUs 44 (central unit-control planes (CU-CPs) 44*a* and central unit-user planes (CU-UPs) 44*b*), a plurality of access and mobility management functions (AMFs) 46, a plurality of session management functions (SMFs) 48, and a plurality of user plane functions (UPFs) 50, as software elements.

In the example of FIG. 3, the RUs 40, the DUs 42, the CU-CPs 44*a*, the AMFs 46, and the SMFs 48 correspond to elements of the control plane (C-plane), and the RUs 40, the DUs 42, the CU-UPs 44*b*, and the UPFs 50 correspond to elements of the user plane (U-plane).

The network service may include other types of NFs as software elements. In addition, the network service is implemented on a plurality of servers or other computer resources (hardware elements).

In this embodiment, for example, the network service illustrated in FIG. 3 provides a communication service in a certain area.

In this embodiment, it is also assumed that the plurality of RUs 40, the plurality of DUs 42, the plurality of CU-UPs 44*b*, and the plurality of UPFs 50, which are illustrated in FIG. 3, belong to one end-to-end network slice.

Figure 4:
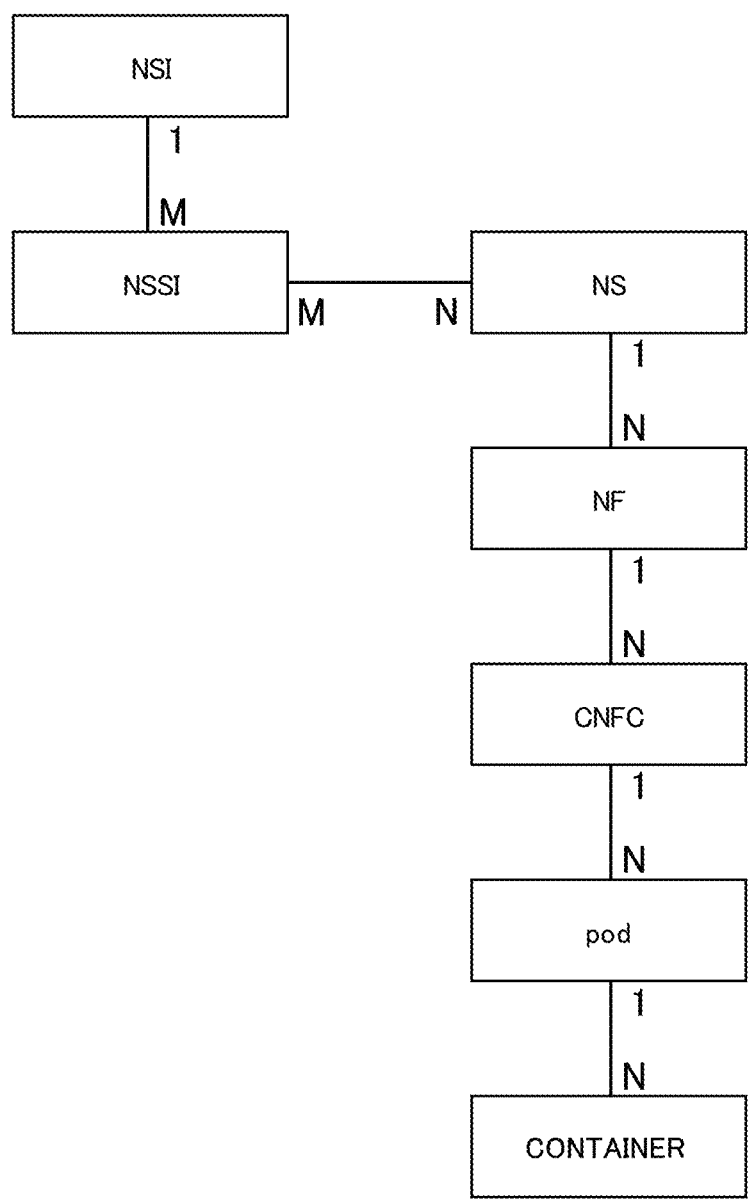
FIG. 4 is a diagram for illustrating an example of links between elements constructed in the communication system in the one embodiment of the present invention.

FIG. 4 is a diagram for schematically illustrating an example of links between elements constructed in the communication system 1 in this embodiment. Symbols M and N indicated in FIG. 4 each represent any integer of 1 or more, and each indicate a relationship between the numbers of elements connected by a link. When the link has a combination of M and N at both ends thereof, the elements connected by the link have a many-to-many relationship. When the link has a combination of 1 and N or a combination of 1 and M at both ends thereof, the elements connected by the link have a one-to-many relationship.

As illustrated in FIG. 4, a network service (NS), a network function (NF), a containerized network function component (CNFC), a pod, and a container have a hierarchical structure.

The NS corresponds to, for example, a network service formed of a plurality of NFs. In this case, the NS may correspond to an element having a granularity, such as a 5GC, an EPC, a 5G RAN (gNB), or a 4G RAN (eNB).

In 5G, the NF corresponds to an element having a granularity, such as the RU, the DU, the CU-UP, the AMF, the SMF, or the UPF. In 4G, the NF corresponds to an element having a granularity, such as a mobility management entity (MME), a home subscriber server (HSS), a serving gateway (S-GW), a vDU, or a vCU. In this embodiment, for example, one NS includes one or a plurality of NFs. That is, one or a plurality of NFs are under the control of one NS.

The CNFC corresponds to an element having a granularity, such as DU mgmt or DU processing. The CNFC may be a microservice deployed on a server as one or more containers. For example, some CNFCs may be microservices that provide a part of the functions of the DU, the CU-CP, the CU-UP, and the like. Some CNFCs may be microservices that provide a part of the functions of the UPF, the AMF, the SMF, and the like. In this embodiment, for example, one NF includes one or a plurality of CNFCs. That is, one or a plurality of CNFCs are under the control of one NF.

The pod refers to, for example, the minimum unit for managing a Docker container by Kubernetes. In this embodiment, for example, one CNFC includes one or a plurality of pods. That is, one or a plurality of pods are under the control of one CNFC.

In this embodiment, for example, one pod includes one or a plurality of containers. That is, one or a plurality of containers are under the control of one pod.

In addition, as illustrated in FIG. 4, a network slice (NSI) and a network slice subnet instance (NSSI) have a hierarchical structure.

The NSIs can be said to be end-to-end virtual circuits that span a plurality of domains (for example, from the RAN 32 to the core network system 34). Each NSI may be a slice for high-speed and high-capacity communication (for example, for enhanced mobile broadband (eMBB)), a slice for high-reliability and low-latency communication (for example, for ultra-reliable and low latency communications (URLLC)), or a slice for connecting a large quantity of terminals (for example, for massive machine type communication (mMTC)). The NSSIs can be said to be single domain virtual circuits dividing an NSI. Each NSSI may be a slice of a RAN domain, a slice of a transport domain such as a mobile back haul (MBH) domain, or a slice of a core network domain.

In this embodiment, for example, one NSI includes one or a plurality of NSSIs. That is, one or a plurality of NSSIs are under the control of one NSI. In this embodiment, a plurality of NSIs may share the same NSSI.

In addition, as illustrated in FIG. 4, the NSSI and the NS generally have a many-to-many relationship.

In addition, in this embodiment, for example, one NF can belong to one or a plurality of network slices. Specifically, for example, network slice selection assistance information (NSSAI) including one or a plurality of pieces of sub-network slice selection assist information (S-NSSAI) can be set for one NF. In this case, the S-NSSAI is information associated with the network slice. The NF is not required to belong to the network slice.

Figure 5:
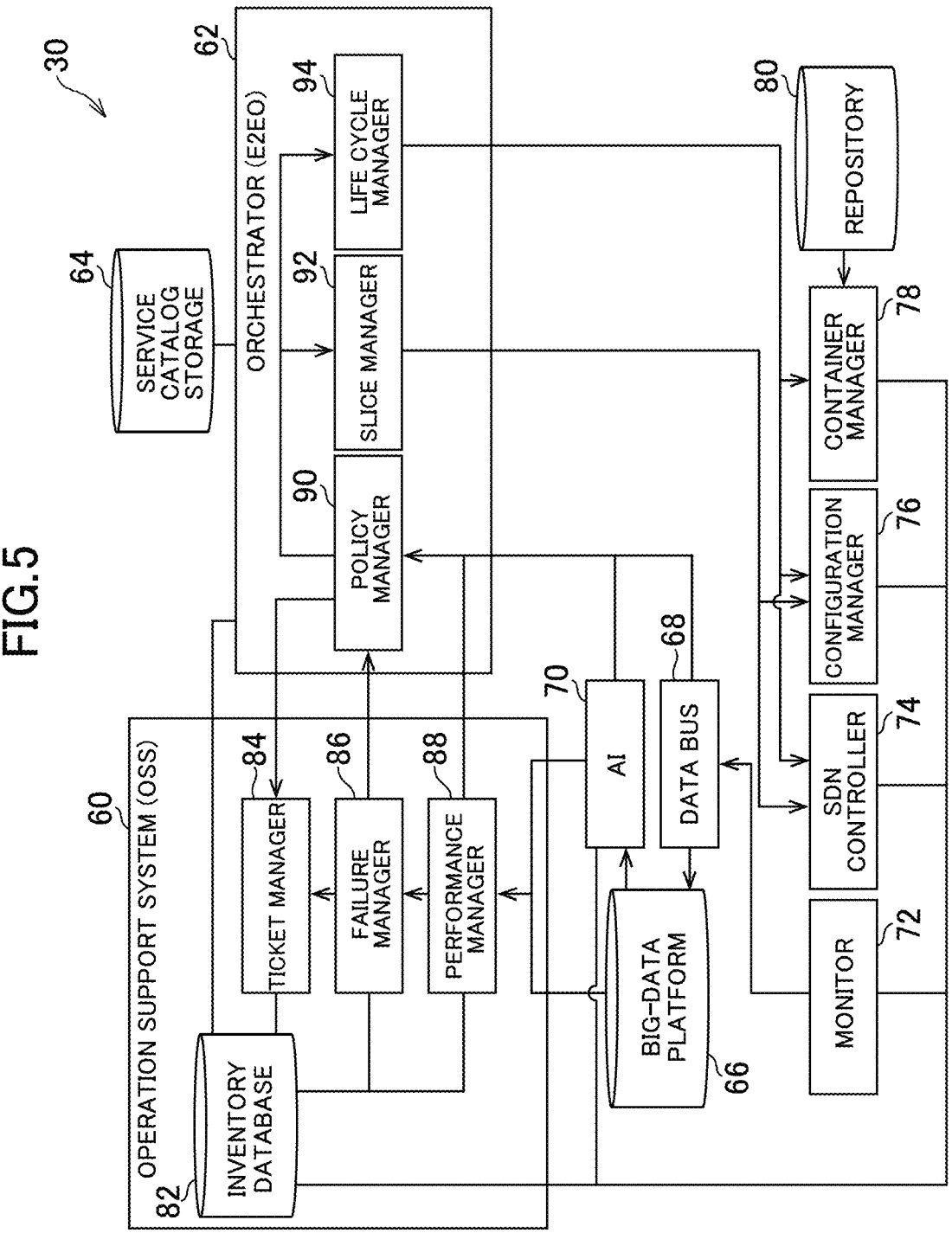
FIG. 5 is a functional block diagram for illustrating an example of functions implemented by a platform system in the one embodiment of the present invention.

FIG. 5 is a functional block diagram for illustrating an example of functions implemented by the platform system 30 in this embodiment. The platform system 30 in this embodiment is not required to implement all the functions illustrated in FIG. 5, and may implement functions other than those illustrated in FIG. 5.

As illustrated in FIG. 5, the platform system 30 in this embodiment functionally includes, for example, an operation orchestrator support system (OSS) 60, an (end-to-end-orchestrator (E2EO)) 62, a service catalog storage 64, a big-data platform 66, a data bus 68, an artificial intelligence (AI) 70, a monitor 72, an SDN controller 74, a configuration manager 76, a container manager 78, and a repository 80. The OSS 60 includes an inventory database 82, a ticket manager 84, a failure manager 86, and a performance manager 88. The E2EO 62 includes a policy manager 90, a slice manager 92, and a life cycle manager 94. Those elements are implemented mainly by the processor 30a, the storage device 30b and the communication device 30c.

The functions illustrated in FIG. 5 may be implemented by executing, by the processor 30a, a program that is installed in the platform system 30, which is one or a plurality of computers, and that includes instructions corresponding to the functions. This program may be supplied to the platform system 30 via a computer-readable information storage medium, such as an optical disc, a magnetic disk, a magnetic tape, a magneto-optical disc, a flash memory, or the like, or via the Internet or the like. The functions illustrated in FIG. 5 may also be implemented by a circuit block, a memory, and other LSIs. Further, a person skilled in the art would understand that the functions illustrated in FIG. 5 can be implemented in various forms by only hardware, by only software, or by a combination of hardware and software.

The container manager 78 executes life cycle management of a container. For example, the life cycle management includes processes relating to the construction of the container such as the deployment and setting of the container.

In this case, the platform system 30 in this embodiment may include a plurality of container managers 78. In each of the plurality of container managers 78, a container management tool such as Kubernetes, and a package manager such as Helm may be installed. Each of the plurality of container managers 78 may execute the construction of a container such as the deployment of the container for a server group (for example, Kubernetes cluster) associated with the container manager 78.

The container manager 78 is not required to be included in the platform system 30. The container manager 78 may be provided in, for example, a server (that is, the RAN 32 or the core network system 34) managed by the container manager 78, or another server that is annexed to the server managed by the container manager 78.

In this embodiment, the repository 80 stores, for example, a container image of a container included in a functional unit group (for example, NF group) that implements a network service.

The inventory database 82 is a database in which inventory information is stored. The inventory information includes, for example, information on a server arranged in the RAN 32 or the core network system 34 and managed by the platform system 30.

Further, in this embodiment, the inventory database 82 stores inventory data. The inventory data indicates the current statuses of the configuration of an element group included in the communication system 1 and the link between the elements. In addition, the inventory data indicates the status of resources managed by the platform system 30 (for example, resource usage status). The inventory data may be physical inventory data or may be logical inventory data. The physical inventory data and the logical inventory data are described later.

Figure 6:
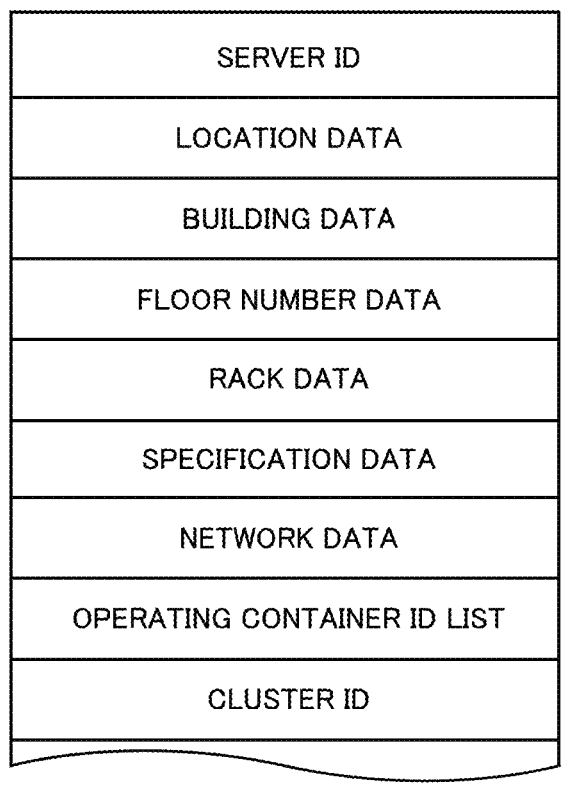
FIG. 6 is a diagram for illustrating an example of data structure of physical inventory data.

FIG. 6 is a diagram for illustrating an example of the data structure of the physical inventory data. The physical inventory data illustrated in FIG. 6 is associated with one server. The physical inventory data illustrated in FIG. 6 includes, for example, a server ID, location data, building data, floor number data, rack data, specification data, network data, an operating container ID list, and a cluster ID.

The server ID included in the physical inventory data is, for example, an identifier of the server associated with the physical inventory data.

The location data included in the physical inventory data is, for example, data indicating the location of the server (for example, the address of the location) associated with the physical inventory data.

The building data included in the physical inventory data is, for example, data indicating a building (for example, a building name) in which the server associated with the physical inventory data is arranged.

The floor number data included in the physical inventory data is, for example, data indicating a floor number at which the server associated with the physical inventory data is arranged.

The rack data included in the physical inventory data is, for example, an identifier of a rack in which the server associated with the physical inventory data is arranged.

The specification data included in the physical inventory data is, for example, data indicating the specifications of the server associated with the physical inventory data. The specification data indicates, for example, the number of cores, the memory capacity, and the hard disk capacity.

The network data included in the physical inventory data is, for example, data indicating information relating to a network of the server associated with the physical inventory data. The network data indicates, for example, an NIC included in the server, the number of ports included in the NIC, and a port ID of each of the ports.

The operating container ID list included in the physical inventory data is, for example, data indicating information relating to one or a plurality of containers operating in the server associated with the physical inventory data. The operating container ID list indicates, for example, a list of identifiers (container IDs) of instances of the containers.

The cluster ID included in the physical inventory data is, for example, an identifier of a cluster (for example, Kubernetes cluster) to which the server associated with the physical inventory data belongs.

The logical inventory data includes topology data for a plurality of elements included in the communication system 1, which indicates the current status of such link between the elements as illustrated in FIG. 4. For example, the logical inventory data includes topology data including an identifier of a certain NS and an identifier of one or a plurality of NFs under the control of the certain NS. In addition, for example, the logical inventory data includes topology data including an identifier of a certain network slice and an identifier of one or a plurality of NFs belonging to the certain network slice.

The inventory data may also include data indicated by the current status of, for example, a geographical relationship or a topological relationship between the elements included in the communication system 1. As described above, the inventory data includes location data indicating locations at which the elements included in the communication system 1 are operating, that is, the current locations of the elements included in the communication system 1. It can be said therefrom that the inventory data indicates the current status of the geographical relationship between the elements (for example, geographical closeness between the elements).

The logical inventory data may also include NSI data indicating information relating to a network slice. The NSI data indicates, for example, attributes such as an identifier of an instance of the network slice and the type of the network slice. The logical inventory data may also include NSSI data indicating information relating to a network slice subnet. The NSSI data indicates, for example, attributes such as an identifier of an instance of the network slice subnet and the type of the network slice subnet.

The logical inventory data may also include NS data indicating information relating to an NS. The NS data indicates, for example, attributes such as an identifier of an instance of the NS and the type of the NS. The logical inventory data may also include NF data indicating information relating to an NF. The NF data indicates, for example, attributes such as an identifier of an instance of the NF and the type of the NF. The logical inventory data may also include CNFC data indicating information relating to a CNFC. The CNFC data indicates, for example, attributes such as an identifier of an instance and the type of the CNFC. The logical inventory data may also include pod data indicating information relating to a pod included in the CNFC. The pod data indicates, for example, attributes such as an identifier of an instance of the pod and the type of the pod. The logical inventory data may also include container data indicating information relating to a container included in the pod. The container data indicates, for example, attributes such as a container ID of an instance of the container and the type of the container.

With the container ID of the container data included in the logical inventory data and the container ID included in the operating container ID list included in the physical inventory data, an instance of the container and the server on which the instance of the container is operating become linked to each other.

Further, data indicating various attributes such as the host name and the IP address may be included in the above-mentioned data included in the logical inventory data. For example, the container data may include data indicating the IP address of a container corresponding to the container data. Further, for example, the NF data may include data indicating the IP address and the host name of an NF indicated by the NE data.

The logical inventory data may also include data indicating NSSAI including one or a plurality of pieces of S-NSSAI, which is set for each NF.

Further, the inventory database 82 can appropriately grasp the resource status in cooperation with the container manager 78. Then, the inventory database 82 appropriately updates the inventory data stored in the inventory database 82 based on the latest resource status.

Further, for example, the inventory database 82 updates the inventory data stored in the inventory database 82 in accordance with execution of an action, such as construction of a new element included in the communication system 1, a change of a configuration of the elements included in the communication system 1, scaling of the elements included in the communication system 1, or replacement of the elements included in the communication system 1.

The inventory database 82 may also include, for each NF, data indicating the importance of the location at which the NF is arranged. For example, important area flags may be linked to the inventory data of gNBs covering areas that include government offices, fire stations, and hospitals, and the like.

The inventory database 82 may also include data indicating the importance of services for elements, such as the NSes, NEs, and network slices. For example, the purchaser may specify an SLA to be satisfied by the NS to be purchased, and an important service flag may be linked to the inventory data of elements requiring guaranteed performance corresponding to the SLA.

The service catalog storage 64 stores service catalog data. The service catalog data may include, for example, service template data indicating the logic to be used by the life cycle manager 94 or the like. This service template data includes information required for constructing the network service. For example, the service template data includes information defining the NS, the NF, and the CNFC and information indicating an NS-NF-CNFC correspondence relationship. Further, for example, the service template data contains a workflow script for constructing the network service.

An NS descriptor (NSD) is an example of the service template data. The NSD is associated with a network service, and indicates, for example, the types of a plurality of functional units (for example, a plurality of CNFs) included in the network service. The NSD may indicate the number of CNFs or other functional units included in the network service for each type thereof. The NSD may also indicate a file name of a CNFD described later, which relates to the CNF included in the network service.

Further, a CNF descriptor (CNFD) is an example of the above-mentioned service template data. The CNFD may indicate computer resources (for example, CPU, memory, and hard disk drive) required by the CNF. For example, the CNFD may also indicate, for each of a plurality of containers included in the CNF, computer resources (such as CPU, memory, and hard disk drive) required by the container.

The service catalog data may also include information to be used by the policy manager 90, the information relating to a threshold value (for example, threshold value for abnormality detection) to be compared to the calculated performance index value. The performance index value is described later.

The service catalog data may also include, for example, slice template data. The slice template includes information required for executing instantiation of the network slice, and includes, for example, the logic to be used by the slice manager 92.

The slice template data includes information on a "generic network slice template" defined by the GSM Association (GSMA) ("GSM" is a trademark). Specifically, the slice template data includes network slice template data (NST), network slice subnet template data (NSST), and network service template data. The slice template data also includes information indicating the hierarchical structure of those elements which is illustrated in FIG. 4.

In this embodiment, for example, the life cycle manager 94 constructs a new network service for which a purchase request has been made in response to the purchase request for the NS by the purchaser.

The life cycle manager 94 may execute, for example, the workflow script associated with the network service to be purchased in response to the purchase request. Then, the life cycle manager 94 may execute this workflow script, to thereby instruct the container manager 78 to deploy the container included in the new network service to be purchased. Then, the container manager 78 may acquire the container image of the container from the repository 80 and deploy a container corresponding to the container image in the server.

In addition, in this embodiment, the life cycle manager 94 executes, for example, scaling or replacement of the element included in the communication system 1. In this case, the life cycle manager 94 may output a container deployment instruction or deletion instruction to the container manager 78. Then, the container manager 78 may execute, for example, a process for deploying a container or a process for deleting a container in accordance with the instruction. In this embodiment, the life cycle manager 94 can execute such scaling and replacement that cannot be handled by Kubernetes of the container manager 78 or other tools.

The life cycle manager 94 may also output an instruction to create a communication route to the SDN controller 74. For example, the life cycle manager 94 presents, to the SDN controller 74, two IP addresses at both ends of a communication route to be created, and the SDN controller 74 creates a communication route connecting those two IP addresses to each other. The created communication route may be managed so as to be linked to those two IP addresses.

The life cycle manager 94 may also output to the SDN controller 74 an instruction to create a communication route between two IP addresses linked to the two IP addresses.

In this embodiment, the slice manager 92 executes, for example, instantiation of a network slice. In this embodiment, the slice manager 92 executes, for example, instantiation of a network slice by executing the logic indicated by the slice template stored in the service catalog storage 64.

The slice manager 92 includes, for example, a network slice management function (NSMF) and a network slice sub-network management function (NSSMF) described in the third generation partnership project (3GPP) (trademark) specification "TS28 533." The NSMF is a function for generating and managing network slices, and provides an NSI management service. The NSSMF is a function for generating and managing network slice subnets forming a part of a network slice, and provides an NSSI management service.

The slice manager 92 may output to the configuration manager 76 a configuration management instruction related to the instantiation of the network slice. Then, the configuration manager 76 may execute configuration management such as settings in accordance with the configuration management instruction.

The slice manager 92 may also present, to the SDN controller 74, two IP addresses to output an instruction to create a communication route between those two IP addresses.

In this embodiment, for example, the configuration manager 76 executes configuration management such as settings of the element group including the NFs in accordance with the configuration management instruction received from the life cycle manager 94 or the slice manager 92.

In this embodiment, for example, the SDN controller 74 creates the communication route between the two IP addresses linked to the creation instruction in accordance with the instruction to create the communication route, which has been received from the life cycle manager 94 or the slice manager 92. The SDN controller 74 may create a communication route between two IP addresses through use of, for example, a publicly known path calculation method such as Flex Algo.

In this case, for example, the SDN controller 74 may use segment routing technology (for example, segment routing IPV6 (SRv6)) to construct an NSI and NSSI for the server or an aggregation router present between communication routes. The SDN controller 74 may also generate an NSI and NSSI extending over a plurality of NFs to be set by issuing, to the plurality of NEs to be set, a command to set a common virtual local area network (VLAN) and a command to assign a bandwidth and a priority indicated by the setting information to the VLAN.

The SDN controller 74 may change the maximum value of the bandwidth that can be used for communication between two IP addresses without constructing a network slice.

The platform system 30 in this embodiment may include a plurality of SDN controllers 74. Each of the plurality of SDN controllers 74 may execute a process such as the creation of a communication route for a network device group including the AGs associated with the SDN controller 74.

In this embodiment, the monitor 72 monitors, for example, the element group included in the communication system 1 based on a given management policy. In this case, for example, the monitor 72 may monitor the element group based on a monitoring policy designated by the purchaser when the purchaser purchases the network service.

In this embodiment, the monitor 72 executes monitoring at various levels, such as a slice level, an NS level, an NF level, a CNFC level, and a level of hardware such as the server.

For example, the monitor 72 may set a module for outputting metric data in the hardware such as the server, or a software element included in the communication system 1 so that monitoring can be performed at the various levels described above. In this case, for example, the NF may output the metric data indicating a metric that can be measured (can be identified) by the NF to the monitor 72. Further, the server may output the metric data indicating a metric relating to the hardware that can be measured (can be identified) by the server to the monitor 72.

In addition, for example, the monitor 72 may deploy, in the server, a sidecar container for aggregating the metric data indicating the metrics output from a plurality of containers in units of CNFCs (microservices). This sidecar container may include an agent called "exporter." The monitor 72 may repeatedly execute a process for acquiring the metric data aggregated in units of microservices from the sidecar container, at predetermined monitoring intervals through use of a mechanism of a monitoring tool, for example, Prometheus capable of monitoring the container management tool such as Kubernetes.

The monitor 72 may monitor performance index values regarding performance indices described in, for example, "TS 28.552, Management and orchestration; 5G performance measurements" or "TS 28.554, Management and orchestration; 5G end to end Key Performance Indicators (KPI)." Then, the monitor 72 may acquire metric data indicating the performance index values to be monitored.

In this embodiment, for example, the monitor 72 executes a process (enrichment) for aggregating metric data in predetermined units of aggregation to generate performance index value data indicating the performance index values of the elements included in the communication system 1 in the units of aggregation.

For example, for one gNB, the metric data indicating the metrics of the elements under control of the gNB (for example, network nodes such as DUs 42 and CUs 44) is aggregated to generate the performance index value data of the gNB. In this way, performance index value data indicating a communication performance in the area covered by the gNB is generated. For example, performance index value data indicating a plurality of types of communication performance, such as traffic amount (throughput) and latency, may be generated in each gNB. However, the communication performance indicated by the performance index value data is not limited to traffic amount and latency.

The monitor 72 outputs the performance index value data generated by the above-mentioned enrichment to the data bus 68.

In this embodiment, for example, the data bus 68 receives the performance index value data output from the monitor 72. Based on the received one or a plurality of pieces of performance index value data, the data bus 68 generates a performance index value file including the one or a plurality of pieces of performance index value data. The data bus 63 then outputs the generated performance index value file to the big-data platform 66.

Further, the elements such as the network slice, the NS, the NF, the CNFC that are included in the communication system 1 and the hardware such as the server notify the monitor 72 of various alerts (for example, notify the monitor 72 of an alert with the occurrence of a failure as a trigger).

Then, for example, when the monitor 72 receives the above-mentioned notification of the alert, the monitor 72 outputs alert message data indicating the notification to the data bus 68. Then, the data bus 68 generates an alert file in which alert message data indicating one or a plurality of notifications are compiled into one file, and outputs the generated alert file to the big-data platform 66.

In this embodiment, the big-data platform 66 accumulates, for example, the performance index value file and the alert file that have been output from the data bus 68.

In this embodiment, for example, a plurality of trained machine learning models are stored in the AI 70 in advance. The AI 70 uses various machine learning models stored in the AI 70 to execute an estimation process such as a future prediction process for a use status and quality of service of the communication system 1. The AI 70 may generate estimation result data indicating results of the estimation process.

The AI 70 may execute the estimation process based on the files accumulated in the big-data platform 66 and the above-mentioned machine learning model. This estimation process is suitable when prediction of a long-term trend is performed infrequently.

Further, the AI 70 can acquire performance index value data stored in the data bus 68. The AI 70 may execute the estimation process based on the performance index value data stored in the data bus 68 and the above-mentioned machine learning model. This estimation process is suitable when short-term predictions are performed frequently.

In this embodiment, for example, the performance manager 88 calculates, based on a plurality of pieces of metric data, a performance index value (for example, KPI) that is based on metrics indicated by those pieces of metric data. The performance manager 88 may calculate a performance index value (for example, performance index value relating to an end-to-end network slice) which is a comprehensive evaluation of a plurality of types of metrics and cannot be calculated from a single piece of metric data. The performance manager 88 may generate comprehensive performance index value data indicating a performance index value being a comprehensive evaluation.

The performance manager 88 may acquire the above-mentioned performance index value file from the big-data platform 66. Further, the performance manager 88 may acquire estimation result data from the AI 70. A performance index value such as a KPI may be calculated based on at least one of the performance index value file or the estimation result data. The performance manager 88 may directly acquire metric data from the monitor 72. Further, the performance index value such as a KPI may be calculated based on the metric data.

In this embodiment, the failure manager 86 detects the occurrence of a failure in the communication system 1 based on, for example, at least any one of the above-mentioned metric data, the above-mentioned notification of the alert, the above-mentioned estimation result data, or the above-mentioned comprehensive performance index value data. The failure manager 86 may detect, for example, the occurrence of a failure that cannot be detected from a single piece of metric data or a single notification of the alert, based on a predetermined logic. The failure manager 86 may also generate detection failure data indicating the detected failure.

The failure manager 86 may directly acquire the metric data and the notification of the alert from the monitor 72. The failure manager 86 may also acquire the performance index value file and the alert file from the big-data platform 66. Further, the failure manager 86 may acquire the alert message data from data bus 68.

In this embodiment, the policy manager 90 executes a predetermined determination process based on, for example, at least any one of the above-mentioned metric data, the above-mentioned performance index value data, the above-mentioned alert message data, the above-mentioned performance index value file, the above-mentioned alert file, the above-mentioned estimation result data, the above-mentioned comprehensive performance index value data, or the above-mentioned detection failure data.

Then, the policy manager 90 may execute an action corresponding to a result of the determination process. For example, the policy manager 90 may output an instruction to construct a network slice to the slice manager 92. The policy manager 90 may also output an instruction for scaling or replacement of the elements to the life cycle manager 94 based on the result of the determination process.

The policy manager 90 in this embodiment can acquire the performance index value data stored in the data bus 68. The policy manager 90 may then execute a predetermined determination process based on the performance index value data acquired from the data bus 68. The policy manager 90 may also execute a predetermined determination process based on the alert message data stored in the data bus 68.

In this embodiment, the ticket manager 84 generates, for example, a ticket indicating information to be notified to an administrator of the communication system 1. The ticket manager 84 may generate a ticket indicating details of the detection failure data. The ticket manager 84 may also generate a ticket indicating a value of the performance index value data or the metric data. The ticket manager 84 may also generate a ticket indicating a determination result obtained by the policy manager 90.

Then, the ticket manager 84 notifies the administrator of the communication system 1 of the generated ticket. The ticket manager 84 may send, for example, an email to which the generated ticket is attached to an email address of the administrator of the communication system 1.

The generation of the performance index value file in the data bus 68 and the estimation process based on the performance index value data stored in the data bus 68 by the AI 70 are further described in the following.

Figure 7:
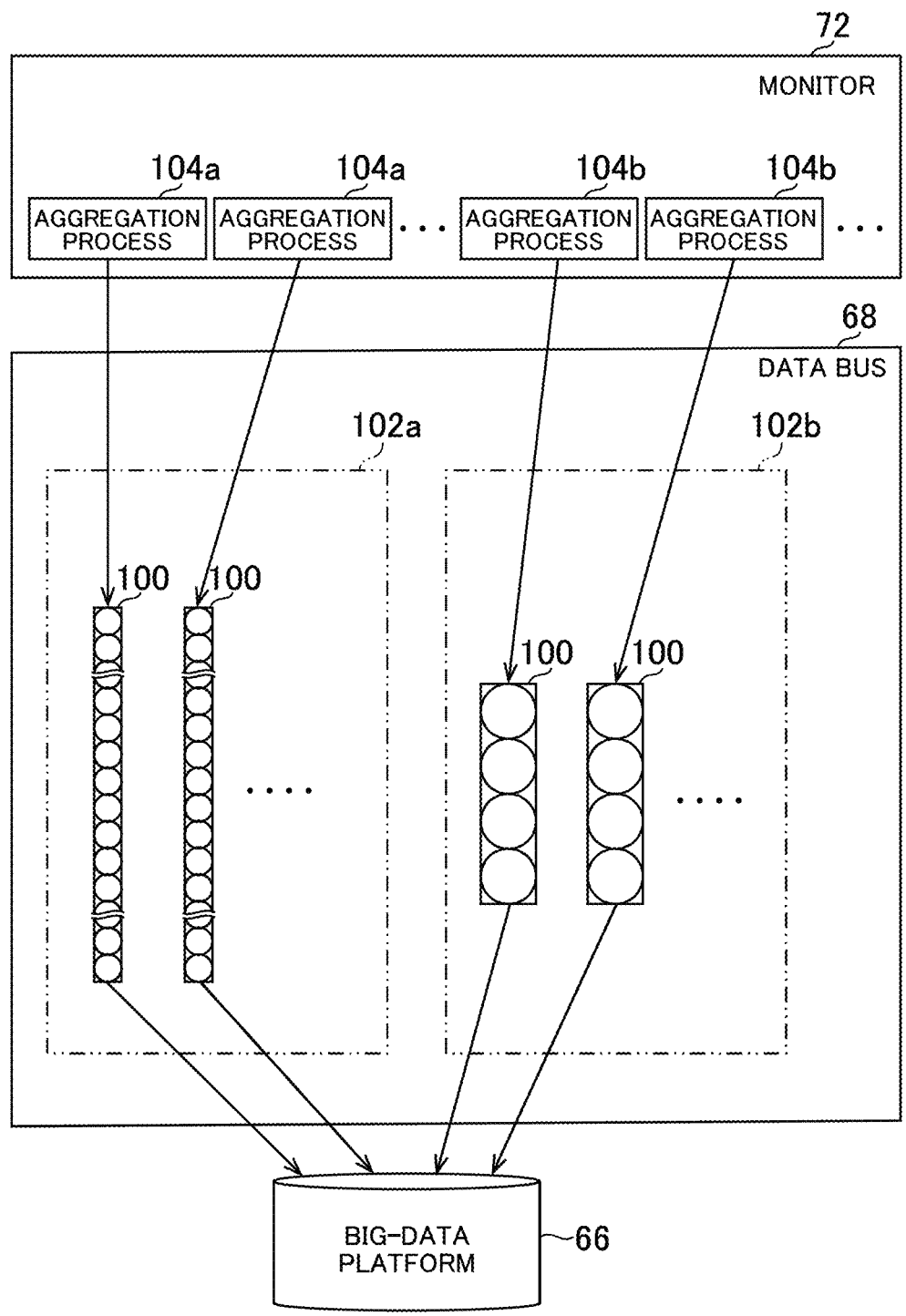
FIG. 7 is a diagram for schematically illustrating an example of a data bus in the one embodiment of the present invention.

FIG. 7 is a diagram for schematically illustrating an example of the data bus 68 in this embodiment. As illustrated in FIG. 7, the data bus 68 in this embodiment includes, for example, a plurality of queues 100 that hold performance index value data in a first-in, first-out list structure.

Each queue 100 belongs to any one of a first queue group 102a or a second queue group 102b.

In this embodiment, for example, a plurality of aggregation processes 104 are operating in the monitor 72. In each aggregation process 104, the elements to be aggregated in the aggregation process 104 are preset. For example, in each aggregation process 104, the gNBs to be aggregated in the aggregation process 104 are preset. Each aggregation process 104 acquires metric data from the NFs (for example, RUs 40, DUs 42, and CU-UPs 44b) under the control of the gNBs to be aggregated in the aggregation process 104. Further, the aggregation process 104 executes an enrichment process for generating performance index value data indicating the communication performance of the gNB based on the acquired metric data.

Further, in this embodiment, for example, the aggregation process 104 and the queue 100 are linked in advance. For convenience, in FIG. 7, a case in which the aggregation process 104 and the queue 100 are linked in a one-to-one relationship is illustrated, but the aggregation process 104 and the queue 100 may be linked in a many-to-many relationship.

The aggregation processes 104 linked to the queues 100 included in the first queue group 102a are hereinafter referred to as "first group aggregation processes 104a." Further, the aggregation processes 104 linked to the queues 100 included in the second queue group 102b are hereinafter referred to as "second group aggregation processes 104b."

At predetermined time intervals (for example, every minute), each first group aggregation process 104a generates performance index value data by aggregating the metric data associated with the first group aggregation process 104a from the previous aggregation to the present time.

The first group aggregation process 104a acquires the metric data from one or a plurality of NFs associated with the first group aggregation process 104a at intervals of, for example, one minute. Then, the first group aggregation process 104a generates performance index value data for the aggregation period by aggregating the metric data for the same aggregation period.

Each time the first group aggregation process 104a generates performance index value data, the first group aggregation process 104a enqueues the performance index value data into one or a plurality of queues 100 linked to the first group aggregation process 104a.

At predetermined time intervals (for example, every fifteen minutes), each second group aggregation process 104b generates performance index value data by aggregating the metric data associated with the second group aggregation process 104b from the previous aggregation to the present time.

The second group aggregation process 104b acquires the metric data from one or a plurality of NFs associated with the second group aggregation process 104b at intervals of, for example, fifteen minutes. Then, the second group aggregation process 104b generates performance index value data for the aggregation period by aggregating the metric data for the same aggregation period.

Each time the second group aggregation process 104b generates performance index value data, the second group aggregation process 104b enqueues the performance index value data into one or a plurality of queues 100 linked to the second group aggregation process 104b.

In this embodiment, the maximum number of pieces of performance index value data that is storable in the queues 100 included in the first queue group 102a is determined in advance. In this case, for example, it is assumed that a maximum of 60 pieces of performance index value data is storable in the queues 100. That is, the maximum number is "60."

Further, in this embodiment, the maximum number of pieces of performance index value data that is storable in the queues 100 included in the second queue group 102b is determined in advance. In this case, for example, it is assumed that a maximum of four pieces of performance index value data is storable in the queues 100. That is, the maximum number is "4."

In this embodiment, for example, a certain one NF may be linked to both the first group aggregation process 104a and the second group aggregation process 104b. To the first group aggregation process 104a, the certain NF may output metric data of the type to be aggregated by the first group aggregation process 104a at intervals of one minute. Further, to the second group aggregation process 104b, the NF may output metric data of the type to be aggregated by the second group aggregation process 104b at intervals of 15 minutes.

The type of the metric data output to the first group aggregation process 104a and the type of the metric data output to the second group aggregation process 104b may be the same or different.

In this case, for example, among the metrics to be monitored by the NF, the metric data of a part of the metrics for which it is desirable to monitor in real time may be output to the first group aggregation process 104a.

In this embodiment, for example, a plurality of estimation processes 106 (see FIG. 8) are operating in the AI 70. A part of those estimation processes 106 execute estimation processes based on the performance index value data stored in the data bus 68, and the rest of the estimation processes 106 execute estimation processes based on files stored in the big-data platform 66.

Further, in this embodiment, for example, the estimation process 106 and the queue 100 are linked in advance. For convenience, in FIG. 8, a case in which the estimation process 106 and the queue 100 are linked in a one-to-one relationship is illustrated, but the estimation process 106 and the queue 100 may be linked in a many-to-many relationship.

In this embodiment, for example, each estimation process 106 acquires the performance index value data stored in the queue 100 which corresponds to the estimation process 106 and which is included in the first queue group 102a. The estimation processes 106 execute the estimation process determined in advance for the relevant estimation process 106 based on the performance index value data.

In this case, for example, in response to performance index value data being enqueued in a queue 100 included in the first queue group 102a, the estimation process 106 acquires a predetermined number of most recent pieces of the performance index value data or the performance index value data of a most recent predetermined period including at least the latest performance index value data among the performance index value data stored in the queue 100. The number of pieces of performance index value data which is acquired is smaller than the maximum number of pieces of performance index value data that is storable in the queue 100.

In this embodiment, the queues 100 included in the first queue group 102*a* are configured so that the performance index value data can be accessed (acquired) without dequeuing any of the performance index value data included in the queue 100.

In this case, for example, in response to performance index value data being enqueued in a queue 100 included in the first queue group 102*a*, the data bus 68 may output a notification indicating that the performance index value data has been enqueued to one or a plurality of estimation processes 106 linked to the queue 100.

When the estimation process 106 receives the notification, in response to the received notification, the estimation process 106 may acquire a predetermined number of most recent pieces of the performance index value data or the performance index value data of a most recent predetermined period including at least the latest performance index value data among the performance index value data stored in the queue 100. The number of pieces of performance index value data which is acquired is smaller than the maximum number of pieces of performance index value data that is storable in the queue 100.

Figure 8:
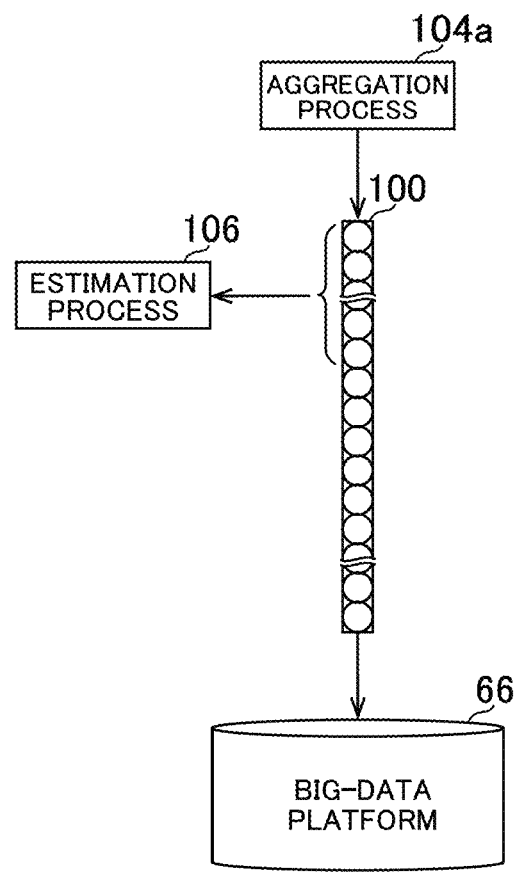
FIG. 8 is a diagram for schematically illustrating an example of acquisition of performance index value data by an estimation process.

In this case, for example, the estimation process 106 illustrated in FIG. 8 acquires 15 pieces of performance index value data, including the latest performance index value data. Those pieces of performance index value data correspond to the most recent 15 minutes of performance index value data, including the latest performance index value data. The estimation process 106 then executes the estimation process based on the acquired performance index value data.

It is not required that the estimation process 106 acquire only a part of the performance index value data stored in the queue 100 as described above, and the estimation process 106 may acquire all the performance index value data stored in the queue 100.

Then, the policy manager 90 determines the status of the communication system 1 based on the performance index value data acquired by the estimation process 106. In this case, the policy manager 90 may determine the status of the communication system 1 based on the estimation result obtained by estimation process 106. In this case, for example, the status of an element included in the communication system 1 and associated with the estimation process 106 may be determined.

Further, in this embodiment, for example, the data bus 68 generates a performance index value file including at least a part of the performance index value data stored in the queue 100 at a frequency lower than the frequency at which the AI 70 acquires the performance index value data.

For example, the data bus 68 may generate, at predetermined time intervals, a performance index value file including the performance index value data stored in the queue 100 after a previous timing of generation of the performance index value file.

In this case, the time interval may or may not match the time (60 minutes in the above example) corresponding to the maximum number of pieces of performance index value data that is storable in the queues 100 included in the first queue group 102*a*.

Further, for example, the data bus 68 may generate a file including all the performance index value data stored in the queue 100 in response to dequeuing of all the performance index value data included in the generated performance index value file. That is, the file including all the performance index value data stored in the queue 100 may be generated in response to the replacement of all the performance index value data stored in the queue 100.

Further, in this embodiment, in a case in which 60 pieces of performance index value data are stored in a queue 100 included in the first queue group 102*a*, when new performance index value data is enqueued, the oldest performance index value data stored in the queue 100 is dequeued. That is, the oldest performance index value data stored in the queue 100 is erased from the queue 100.

The maximum number of pieces of performance index value data that is storable in the queues 100 included in the first queue group 102*a* is not limited to 60. For example, the maximum number of pieces of performance index value data that is storable in the queues 100 included in the first queue group 102*a* may be 180. In this case, the performance index value file may be generated at intervals of three hours.

In this embodiment, when four pieces of performance index value data are stored in a queue 100 included in the second queue group 102*b*, the data bus 68 generates a performance index value file in which those four pieces of performance index value data are consolidated into one file. The data bus 68 then outputs the generated performance index value file to the big-data platform 66.

The data bus 68 dequeues all the performance index value data stored in the queue 100. That is, all the performance index value data stored in the queue 100 is erased from the queue 100.

In this way, the process executed in response to the generation of the performance index value file is different for the queues 100 included in the first queue group 102*a* from that for the queues 100 included in the second queue group 102*b*. For the queues 100 included in the second queue group 102*b*, all the performance index value data stored in a queue 100 is erased from the queue 100 in response to the generation of the performance index value file. Meanwhile, for the queues 100 included in the first queue group 102*a*, dequeuing in response to the generation of the performance index value file is not executed.

Further, in this embodiment, the policy manager 90 may acquire, in response to the performance index value data being enqueued in a queue 100 included in the first queue group 102*a*, a predetermined number of most recent pieces of the performance index value data or the performance index value data of a most recent predetermined period including at least the latest performance index value data among the performance index value data stored in the queue 100. The number of pieces of performance index value data which is acquired is smaller than the maximum number of pieces of performance index value data that is storable in the queue 100. The policy manager 90 may then determine the status of the communication system 1 based on the acquired performance index value data.

For example, when the predicted value of the traffic amount of a certain gNB indicated by the estimation result data is less than a predetermined value, the policy manager 90 may instruct the life cycle manager 94 to increase the allocation of resource blocks. Further, the allocation of the resource blocks for the gNB may be increased. Moreover, when the predicted value of the traffic amount of a certain gNB indicated by the estimation result data is less than a predetermined value, the policy manager 90 may instruct the life cycle manager 94 to scale out the gNB. Then, the elements under the control of the gNB may be scaled out.

In this embodiment, the data bus 68 may suitably generate the queue 100 in which the performance index value data is stored. Further, the monitor 72 may suitably generate the queue 100 in which the performance index value data is stored. In addition, the AI 70 may suitably generate the queue 100 in which the performance index value data is stored.

As described above, the platform system 30 in this embodiment includes a determiner which acquires, in response to performance index value data being enqueued in a queue 100, a predetermined number of most recent pieces of the performance index value data or the performance index value data of a most recent predetermined period including the latest performance index value data among the performance index value data stored in the queue 100, the number of pieces of performance index value data which is acquired being smaller than the maximum number of pieces of performance index value data that is storable in the queue 100, and determines the status of the communication system 1 based on the acquired performance index value data. In this case, for example, the above-mentioned estimation process 106 and policy manager 90 as a whole may correspond to the determiner. Further, the policy manager 90 may correspond to the determiner.

In addition, the platform system 30 in this embodiment includes a file generator which generates a file including at least part of the performance index value data stored in the queue 100 at a frequency lower than the frequency at which the above-mentioned determiner acquires the performance index value data. In the above-mentioned example, the data bus 68 corresponds to the file generator.

In a case in which the status of the communication system 1 is determined based on a file stored in the big-data platform 66, the latest performance index value data may not be included in the latest file. Accordingly, when the status of the communication system 1 is determined based on such a file, a proper determination result may not be obtained.

In this embodiment, as described above, the status of the communication system 1 is determined based on a predetermined number of most recent pieces of the performance index value data or the performance index value data of a most recent predetermined period including at least the latest performance index value data among the performance index value data stored in the queue. Thus, according to this embodiment, the status of the communication system 1 can be properly determined.

Now, further description is given of an example of estimation by the AI 70 and determination of the status of the communication system 1 by the policy manager 90.

In the following description, the first group aggregation process 104a associated with a certain specific gNB generates performance index value data relating to the gNB by aggregating the metric data relating to the elements included in the gNB (for example, elements under the control of the gNB).

For example, performance index value data indicating a traffic amount of the user plane of the gNB is generated by aggregating metric data indicating the traffic amount of the RUs 40, DUs 42, and CU-UPs 44b included in the gNB. The performance index value data may indicate another communication performance. Moreover, the performance index value data may indicate a plurality of types of communication performance.

The first group aggregation process 104a enqueues the generated performance index value data in the queue 100 linked to the first group aggregation process 104a.

In the following description, it is assumed that the first group aggregation process 104a performs aggregation and enqueuing at intervals of one minute. Further, it is assumed that the queue 100 is capable of storing at least 60 pieces of performance index value data.

In this embodiment, in response to the enqueuing of the performance index value data, the estimation process 106 linked to the queue 100 acquires a predetermined number of most recent pieces of the performance index value data including the latest performance index value data among the performance index value data stored in the queue 100. In this case, for example, 60 pieces of performance index value data are acquired. Those 60 pieces of performance index value data show the traffic amount of the gNB in the most recent 60 minutes until the present time.

Then, the estimation process 106 predicts, based on the performance index value before a given reference time point relating to the communication system 1, the network load in the period from "the reference time point" until "a predetermined time after the reference time point" (the period for which the network load is predicted is hereinafter also referred to as "prediction period").

In this case, for example, the estimation process 106 uses a trained machine learning model stored in advance in the AI 70 to predict the traffic amount of the gNB from the current time to 20 minutes after the current time based on the 60 pieces of performance index value data.

The machine learning model may be, for example, an existing prediction model. Further, for example, the machine learning model may be a trained machine learning model in which supervised learning using a plurality of pieces of training data has been executed in advance. In this case, each of those plurality of pieces of training data may include, for example, for given time points different from each other, learning input data indicating the traffic amount in the gNB for 60 minutes until the time point and teacher data indicating the traffic amount in the gNB from the time point until 20 minutes after the time point.

Then, the estimation process 106 outputs estimation result data indicating the above-mentioned estimation result (prediction result) to the policy manager 90.

The aggregation interval of the performance index value data and the time interval of the traffic amount indicated in the estimation result data may be the same or different. For example, the estimation result data may indicate a traffic amount for intervals of one minute, or may indicate a traffic amount for a longer time interval (for example, intervals of two minutes), or may indicate a traffic amount for a shorter time interval (for example, intervals of 30 seconds).

Then, in response to the prediction by the estimation process 106, the policy manager 90 determines whether or not the magnitude of the predicted value of the network load in the period satisfies a given condition. For example, it is determined whether or not to scale out the gNB based on the estimation result data received from the estimation process 106.

When it is determined that the given condition is satisfied in the above-mentioned determination, the policy manager 90, the life cycle manager 94, the container manager 78, and the configuration manager 76 may cooperate with each other to execute scale-out of the element included in the communication system 1. For example, scale-out of the DUs 42 and CU-UPs 44b included in the gNB may be executed.

The policy manager 90, the life cycle manager 94, the container manager 78, and the configuration manager 76, which cooperate with each other to execute scale-out, are hereinafter collectively referred to as "scale-out executor."

FIG. 9 to FIG. 15 are each a graph for schematically showing an example of a graphical representation of estimation result data. In FIG. 9 to FIG. 15, the horizontal axis represents a time "t" from a given reference time point (for example, the current time), and the vertical axis represents a traffic amount y (t) in the gNB. In FIG. 9 to FIG. 15, the traffic amount is represented by a smooth graph for the sake of illustration, but in the actual estimation result data, the traffic amount is shown discretely.

In this embodiment, for example, the traffic amount at each of a plurality of prediction time points each having a different length of time from the given reference time point is predicted. For example, the traffic amount from the reference time point to 20 minutes after the reference time point is predicted.

A period from the "reference time point" until a "first time after the reference time point" (for example, from the reference time point until 10 minutes after the reference time point) is hereinafter referred to as "first period." Further, a period from the "first time after the reference time point" until a "second time after the reference time point" (for example, from 10 minutes after the reference time point until 20 minutes after the reference time point) is hereinafter referred to as "second period."

The policy manager 90 may determine whether or not the predicted value of the traffic amount exceeds a predetermined threshold value th1 in the first period.

When a prediction time point at which the predicted value of the traffic amount exceeds the predetermined threshold value th1 exists in the first period, the scale-out described above may be executed.

In this case, the policy manager 90 may determine whether or not the predicted value of the network load at each of a plurality of prediction time points included in the first period exceeds a threshold value. When it is determined that the predicted value exceeds a threshold value t1 at a part or all of the plurality of prediction time points, the scale-out described above may be executed.

Figure 9:
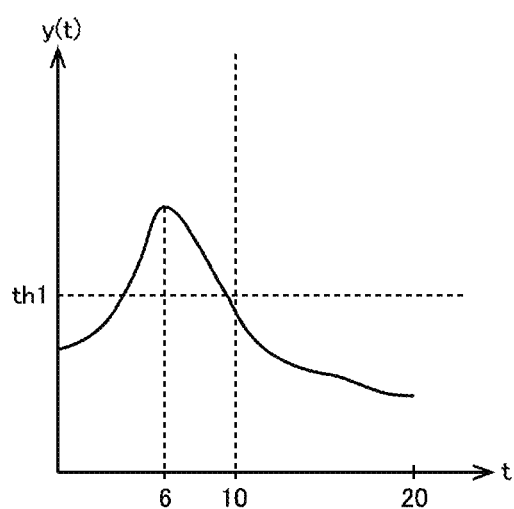
FIG. 9 is a graph for schematically showing an example of a graphical representation of estimation result data.

In the example of FIG. 9, the predicted value of the traffic amount at the prediction time point 6 minutes after the reference time point exceeds the threshold value t1. Thus, when the policy manager 90 receives estimation result data corresponding to the graph of FIG. 9, scale-out is executed.

Further, the policy manager 90 may determine whether or not the predicted value of the traffic amount exceeds the predetermined threshold value th1 in the second period, that is, may determine whether or not a prediction time point at which the predicted value of the traffic amount exceeds the predetermined threshold value th1 exists in the second period.

When it is determined that the given condition is satisfied in a predetermined number of two or more determinations for at least partially overlapping periods, the scale-out executor may execute scale-out of the element included in the communication system 1. That is, it may be determined whether or not the given condition is satisfied for each of two or more prediction periods which have different reference time points but at least partially overlap. When it is determined that the condition is satisfied for a predetermined number or more of prediction periods, the scale-out executor may execute scale-out. The predetermined number may be appropriately determined in accordance with the required quality and the specifications of the communication system 1, for example.

For example, when the reference time point is 3:00 pm, the period from 3:10 pm to 3:20 pm corresponds to the second period. Further, when the reference time point is 3:01 pm, the period from 3:11 pm to 3:21 pm corresponds to the second period. In addition, when the reference time point is 3:02 pm, the period from 3:12 pm to 3:22 pm corresponds to the second period.

Those three second periods at least partially overlap. Specifically, the period from 3:02 pm to 3:20 pm overlaps.

In this case, the scale-out executor may execute scale-out when a predetermined number of the determinations (for example, three determinations) are a determination that the predicted value of the traffic amount exceeds the predetermined threshold value th1 in the second period. In other words, a determination is performed for each of those three prediction periods which have different reference time points but at least partially overlap, and when the number of determinations in which it is determined that the predicted value of the traffic amount exceeds the predetermined threshold value th1 in the second period is equal to or more than a predetermined number (for example, all three determinations result in such determinations), the scale-out executor may execute scale-out.

For example, the scale-out executor may execute scale-out when a predetermined number of the determinations are a determination that the predicted value exceeds the threshold value t1 at a part or all of the plurality of prediction time points.

Figure 10A:
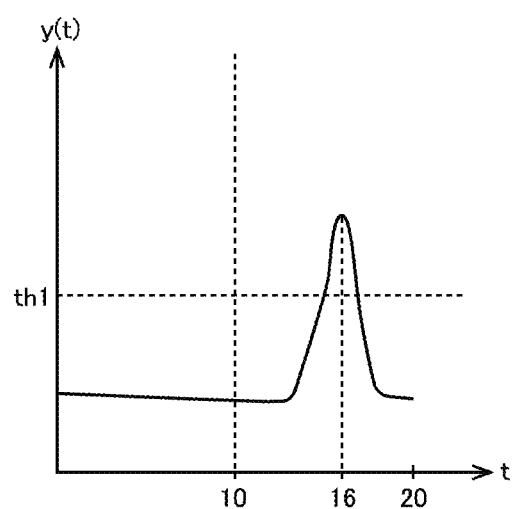
FIG. 10A is a graph for schematically showing an example of a graphical representation of estimation result data.
Figure 10B:
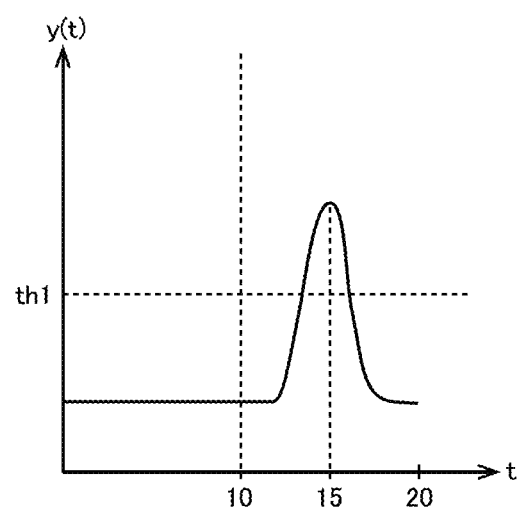
FIG. 10B is a graph for schematically showing an example of a graphical representation of estimation result data.
Figure 10C:
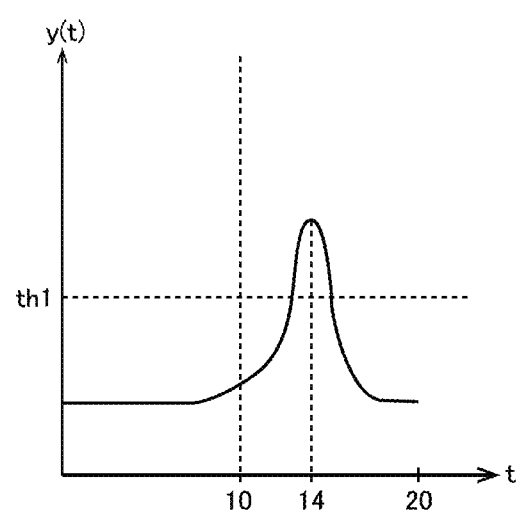
FIG. 10C is a graph for schematically showing an example of a graphical representation of estimation result data.

FIG. 10A is a graph for showing an example of a graph corresponding to estimation result data in which the reference time point is 3:00 pm. FIG. 10B is a graph for showing an example of a graph corresponding to estimation result data in which the reference time point is 3:01 pm. FIG. 10C is a graph for showing an example of a graph corresponding to estimation result data in which the reference time point is 3:02 pm. In this way, the predicted values of the network load are shown for a plurality of time periods which have reference time points different from each other by one minute but at least partially overlap.

In the example of FIG. 10A, the predicted value of the traffic amount at the prediction time point of 3:16, which is 16 minutes after the reference time point, exceeds the threshold value t1. In the example of FIG. 10B, the predicted value of the traffic amount at the prediction time of 3:16, which is 15 minutes after the reference time point, exceeds the threshold value t1. In the example of FIG. 10C, the predicted value of the traffic amount at the prediction time of 3:16, which is 14 minutes after the reference time point, exceeds the threshold value t1. In this case, in the determinations for the two or more (in this case, three) prediction periods which have different reference time points but at least partially overlap, the number of determinations that the condition is satisfied is equal to or more than the predetermined number (in this case, three). Thus, when the policy manager 90 continuously receives estimation result data corresponding to the graphs of FIG. 10A to FIG. 10C, scale-out is executed.

As described above, the scale-out executor may execute scale-out when a predetermined number of consecutive determinations (for example, three determinations) are a determination that the predicted value of the traffic amount exceeds the predetermined threshold value th1 in the second period.

Further, as described above, the condition for executing scale-out may be different between the first period and the second period. For example, for the second period, the scale-out executor may execute scale-out of the element included in the communication system 1 when it is determined that the given condition is satisfied in a predetermined number of two or more determinations in which the periods at least partially overlap. In other words, the scale-out executor may execute scale-out of the element included in the communication system 1 when, in the determinations for the two or more prediction periods which have different reference time points but at least partially overlap, a predetermined number or more of the determinations are a determination that a magnitude of the predicted value in a period from the first time after the reference time point until the second time after the reference time point satisfies the given condition.

Meanwhile, for the first period, the scale-out executor may execute scale-out of the element included in the communication system 1 in response to one determination that the magnitude of the predicted value satisfies the given condition. In this way, the element included in the communication system 1 may be controlled in accordance with the length of time from the reference time point to the timing closest to the reference time point at which the network load exceeds the threshold value. In other words, the scale-out executor may execute scale-out of the element included in the communication system 1 in response to, in the determinations for the prediction period, one determination that the magnitude of the predicted value in the period from the reference time point to the first time after the reference time point satisfies the given condition.

It takes a certain amount of time to execute scale-out, and therefore when the network load is predicted to increase in the above-mentioned first period, for example, it is desired to execute scale-out immediately.

Meanwhile, when the network load is predicted to increase in the above-mentioned second period, there is a safety margin in terms of time for executing scale-out.

However, in general, as the time until the time point at which the network load is predicted (prediction time point) becomes longer, the prediction accuracy tends to be lower. When it is predicted that the network load is to increase based on a low-accuracy prediction, the network load may increase at an earlier timing than the prediction. In consideration of that risk, it is conceivable to execute scale-out early in order to have a safety margin.

However, on the other hand, because the prediction accuracy is low, it is highly likely that the network load is not going to actually increase as much as predicted, and in that case, it is better not to execute scale-out.

As described above, in this embodiment, when it is predicted that the network load is to increase in the second period, scale-out is not executed immediately, and when it is predicted in a plurality of predictions that the network load is to increase, scale-out is executed.

As described above, according to this embodiment, an element included in the communication system 1 can be scaled out appropriately.

Further, in this embodiment, in response to a determination that the given condition is satisfied in the determinations for the two or more prediction periods which have different reference time points but at least partially overlap, the policy manager 90 may determine whether or not a trend of the maximum value of the predicted value of the network load satisfies a condition different from the above-mentioned given condition (condition relating to the trend of the maximum value). Further, based on this determination, it may be determined whether or not to execute scale-out. When it is determined to execute scale-out, the scale-out executor may then execute scale-out of the element included in the communication system 1. For example, scale-out of the element included in the communication system 1 may be executed in response to a determination that the trend of the maximum value of the predicted value of the network load satisfies the above-mentioned different condition.

When the maximum value of the predicted value of the network load is on a downward trend, the policy manager 90 may determine that the condition relating to the trend of the maximum value is not satisfied, and determine not to execute scale-out.

Figure 11A:
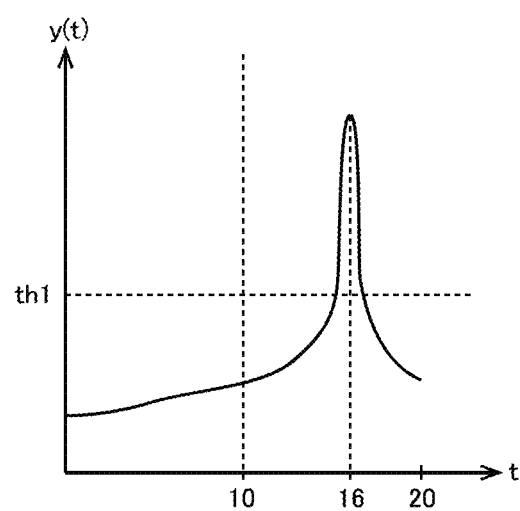
FIG. 11A is a graph for schematically showing an example of a graphical representation of estimation result data.
Figure 11B:
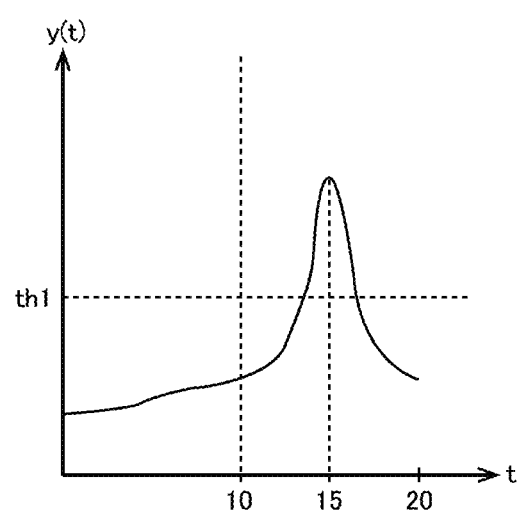
FIG. 11B is a graph for schematically showing an example of a graphical representation of estimation result data.
Figure 11C:
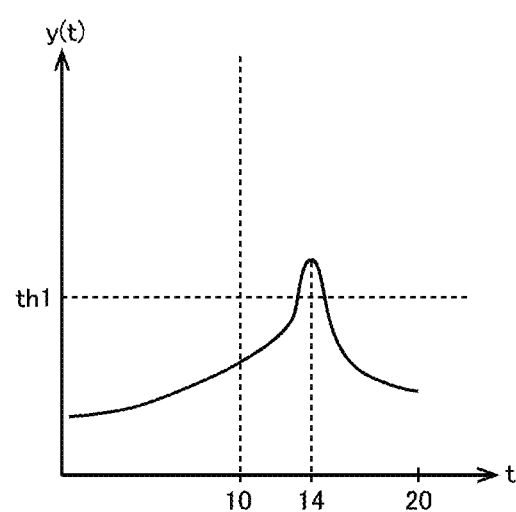
FIG. 11C is a graph for schematically showing an example of a graphical representation of estimation result data.

FIG. 11A is a graph for showing another example of a graph corresponding to estimation result data in which the reference time point is 3:00 pm. FIG. 11B is a graph for showing another example of a graph corresponding to estimation result data in which the reference time point is 3:01 pm. FIG. 11C is a graph for showing another example of a graph corresponding to estimation result data in which the reference time point is 3:02 pm.

In the examples of FIG. 10A to FIG. 10C, the prediction at 3:01 pm has a larger maximum value of the predicted value of the traffic amount than the prediction at 3:00 μm. In this case, scaling out may be executed, as described above.

Meanwhile, in the examples of FIG. 11A to FIG. 11C, the prediction at 3:01 pm has a smaller maximum value of the predicted value of the traffic amount than the prediction at 3:00 pm. Further, the prediction at 3:02 pm has a smaller maximum value of the predicted value of the traffic amount than the prediction at 3:01 pm. Thus, in a situation in which the maximum value of the predicted value of the traffic amount is on a downward trend, scale-out may not be executed.

It is assumed that a prediction is subsequently performed at 3:03 pm, and the maximum value of the predicted value of the traffic amount is larger at 3:03 pm than at 3:02 pm. In this case, scale-out may be executed.

When the maximum value of the predicted value of the network load is on a downward trend, it is highly likely that the network load is not going to actually be as high as predicted. Thus, through suppression of the execution of scale-out in such a case, the element included in the communication system 1 can be scaled out more appropriately.

Further, the scale-out executor may execute scale-out of the element included in the communication system 1 in response to one determination that the magnitude of the predicted value of the network load satisfies a given condition for a period of time having a length equal to or more than a predetermined duration in the prediction period.

For example, scale-out may be executed in response to one determination that the predicted value of the traffic amount exceeds the threshold value th1 for a predetermined period of time (for example, 3 minutes) or longer in the second period.

Figure 12:
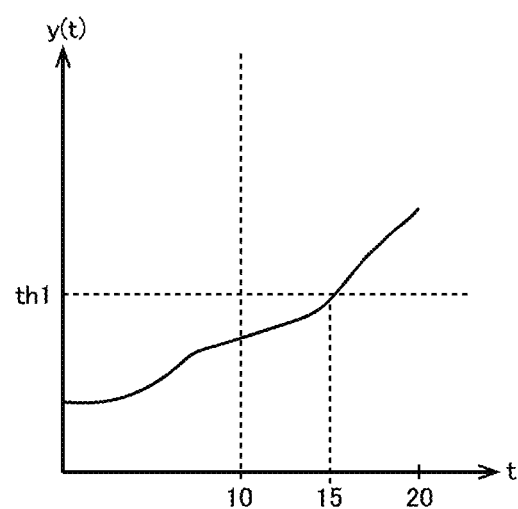
FIG. 12 is a graph for schematically showing an example of a graphical representation of estimation result data.

For example, as shown in FIG. 12, scale-out may be executed in response to one determination that the predicted value of the traffic amount exceeds the threshold value th1 for 5 minutes from "15 minutes after the reference time point" to "20 minutes after the reference time point."

When the magnitude of the predicted value of the network load satisfies the predetermined condition for a long time, there is a strong requirement to execute scale-out while the possibility that the peak of the network load indicated in the prediction result is a random result or noise is low. Thus, it may be reasonable to immediately execute scale-out in such a situation. With this configuration, the element included in the communication system 1 can be scaled out more appropriately.

Further, as shown in FIG. 12, the scale-out executor may execute scale-out of the element included in the communication system 1 in response to one determination that the magnitude of the predicted value of the network load satisfies a given condition for a period of time having a length equal to or more than a predetermined duration until an end of the prediction period.

In the example of FIG. 12, in a situation in which a prediction is performed until 20 minutes after the reference time point, the predicted value of the traffic amount exceeds the threshold value th1 for 5 minutes until 20 minutes after the reference time point. In other words, the predicted value of the traffic amount exceeds the threshold value th1 for the last 5 minutes of a prediction period having a time length of 20 minutes. In such a situation, there is a high possibility that the predicted value of the traffic amount 20 minutes after the reference time point exceeds the threshold value th1 in subsequent predictions as well.

Thus, it may be more reasonable to immediately execute scale-out in such a situation. With this configuration, the element included in the communication system 1 can be scaled out more appropriately.

Further, in this embodiment, the above-mentioned threshold value may be associated with the prediction time point, and may increase as the length of time from the reference time point to the prediction time point increases.

Figure 13:
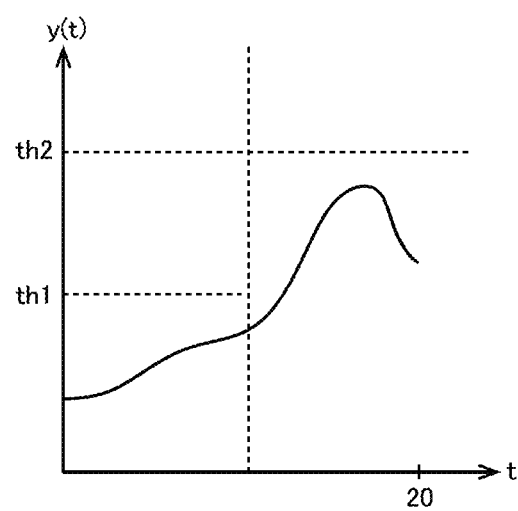
FIG. 13 is a graph for schematically showing an example of a graphical representation of estimation result data.
Figure 14:
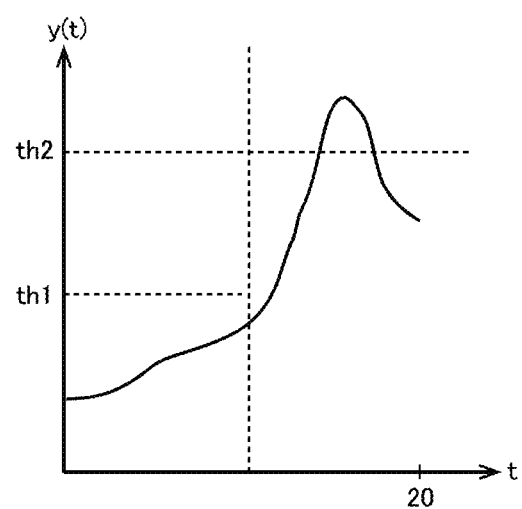
FIG. 14 is a graph for schematically showing an example of a graphical representation of estimation result data.

For example, as shown in FIG. 13 and FIG. 14, a threshold value t2 in the second period may be larger than the threshold value t1 in the first period.

Further, for at least one prediction time point included in the first period, the policy manager 90 may determine whether or not the magnitude of the predicted value of the network load at the prediction time point exceeds the threshold value th1. For at least one prediction time point included in the second period, the policy manager 90 may determine whether or not the magnitude of the predicted value of the network load at the prediction time point exceeds the threshold value th2.

When it is determined that the predicted value exceeds the threshold value at a part or all of the plurality of prediction time points, the scale-out executor may execute scale-out of the element included in the communication system 1.

In the example of FIG. 13, the predicted value of the traffic amount in the first period does not exceed the threshold value t1, and the predicted value of the traffic amount in the second period does not exceed the threshold value t2. Thus, in this case, scale-out is not executed.

Meanwhile, in the example of FIG. 14, the predicted value of the traffic amount in the first period does not exceed the threshold value t1, but the predicted value of the traffic amount in the second period exceeds the threshold value t2. Thus, in this case, scale-out is executed.

Even when the threshold value is associated with a prediction time point and increases as the length of time from the reference time point to the prediction time point increases, as described above, for the second period, when it is determined that the predicted value exceeds the threshold value th2 in a predetermined number of two or more determinations, the scale-out executor may execute scale-out of the element included in the communication system 1.

As another example, in such a case, even in the second period, like in the first period, the scale-out executor may execute scale-out of the element included in the communication system 1 in response to one determination that the predicted value exceeds the threshold value th2.

Figure 15:
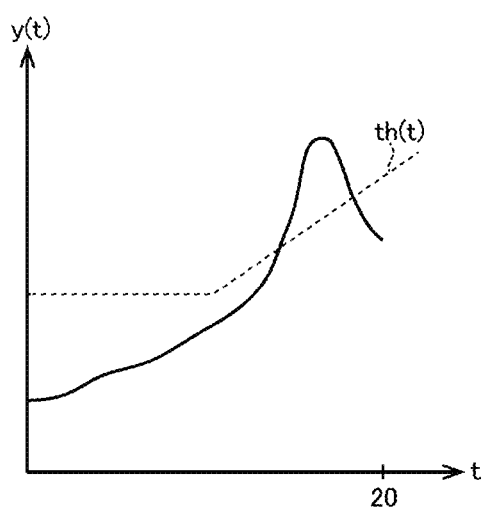
FIG. 15 is a graph for schematically showing an example of a graphical representation of estimation result data.

Further, as shown in FIG. 15, the threshold value may be a function of the length of time from the reference time point to the prediction time point. In the example of FIG. 15, there is a predicted value that exceeds the threshold value th(t) indicated by the dashed line, and thus scale-out is executed.

As described above, in general, as the time from the reference time point to the prediction time point becomes longer, the prediction accuracy tends to be lower. Thus, even when the prediction accuracy is low, in a situation in which the predicted value of the network load exceeds a large threshold value, there is a strong requirement to execute scale-out while the possibility that the peak of the network load is a random result or noise is low.

When the above-mentioned threshold value is associated with a prediction time point and increases as the length of time from the reference time point to the prediction time point increases, for a prediction time point having a low prediction accuracy, a condition that the predicted value exceeds the threshold value is not satisfied unless the predicted value of the network load is extremely large. Thus, with this setting, the element included in the communication system 1 can be scaled out more appropriately.

In the description given above, the above-mentioned determination is performed based on the prediction result of the traffic amount, but the determination may be performed based on another communication performance (for example, latency). Further, the determination may be performed based on a comprehensive evaluation value calculated based on a plurality of performance index values. For example, it may be determined whether or not a comprehensive evaluation value calculated based on the traffic amount and latency exceeds a threshold value.

Further, scale-out of the user plane of a gNB has been described above, but scale-out may be executed in the same manner on the control plane of the gNB. For example, whether or not to execute scale-out of the DUs 42 and the CU-CPs 44a may be determined based on a prediction result which is based on performance index value data indicating at least one performance index value out of, for example, the number of registrations, the number of active users, a handover completion count.

Further, in this embodiment, scale-out of the element of the core network system 34 may be executed in place of the element of the RAN 32 such as a gNB. For example, scale-out may be executed on the AMFs 46, the SMFs 48, and the UPFs 50. Further, in this case, performance index value data relating to the element of the core network system 34 may be used to determine whether or not to execute scale-out. As another example, performance index value data relating to the element of the RAN 32 and the element of the core network system 34 may be used for the determination.

Further, scale-out of transport may be executed in the same way.

Figure 16:
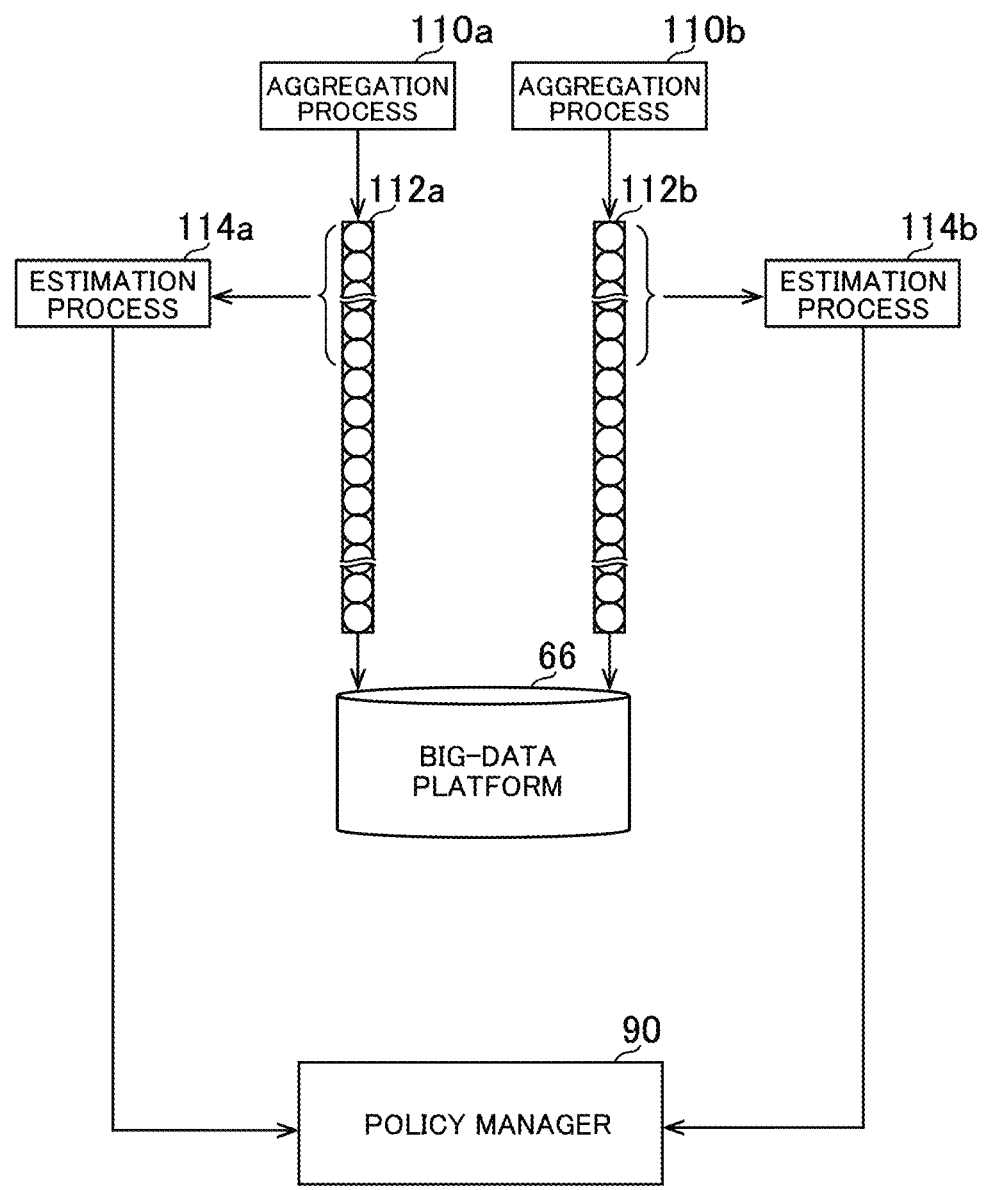
FIG. 16 is a diagram for schematically illustrating an example of acquisition of the performance index value data by the estimation process.

Further, in this embodiment, in the monitor 72, as illustrated in FIG. 16, for a certain specific gNB, an aggregation process 110a for aggregating the communication performance of the elements relating to the control plane of the gNB and an aggregation process 110b for aggregating the communication performance of the elements relating to the user plane of the gNB may be operated.

Further, the data bus 68 may include a queue 112a in which the performance index value data output from the aggregation process 110a is stored and a queue 112b in which the performance index value data output from the aggregation process 110b is stored.

Further, in the AI 70, an estimation process 114a for acquiring the performance index value data stored in the queue 112a and an estimation process 114b for acquiring the performance index value data stored in the queue 112b may be operated.

Further, the policy manager 90 may determine the status of the communication system 1 based on the estimation result obtained by the estimation process 114*a* and the estimation result obtained by the estimation process 114*b*.

For example, the policy manager 90 may determine the threshold value based on the prediction result of the network load of the control plane included in the communication system 1. For example, as the network load of the control plane becomes higher, a smaller value may be determined as the threshold value.

For example, the policy manager 90 may determine the threshold value based on the estimation result data output from the estimation process 114*a* to the policy manager 90.

Further, the policy manager 90 may determine whether or not the magnitude of the predicted value of the network load of the user plane included in the communication system 1 exceeds the threshold value determined as described above.

For example, the policy manager 90 may determine whether or not the magnitude of the predicted value indicated by the estimation result data output from the estimation process 114*b* to the policy manager 90 exceeds the threshold value determined as described above.

Then, when it is determined that the above-mentioned predicted value exceeds the above-mentioned threshold value at a part or all of the plurality of prediction time points, the scale-out executor may execute scale-out of the element forming a part or all of the user plane included in the communication system 1.

As another example, the scale-out executor may execute scale-out of the element forming a part or all of the user plane included in the communication system 1 when, in the determinations for the two or more prediction periods which have different reference time points but at least partially overlap, a predetermined number or more of the determinations are a determination that the magnitude of the predicted value exceeds the determined threshold value.

Further, in this embodiment, the policy manager 90 may determine a coefficient based on the prediction result of the network load of the control plane included in the communication system 1. For example, as the network load of the control plane becomes higher, a larger value may be determined as the value of the coefficient.

For example, the policy manager 90 may determine the coefficient based on the estimation result data output from the estimation process 114*a* to the policy manager 90.

Further, for each of the plurality of prediction time points, the policy manager 90 may determine whether or not a condition that the magnitude of a corrected predicted value obtained by multiplying the predicted value of the network load of the user plane included in the communication system 1 at the prediction time point by the coefficient exceeds the threshold value is satisfied.

For example, the policy manager 90 may determine whether or not a condition that the magnitude of the corrected predicted value obtained by multiplying the predicted value indicated by the estimation result data output from the estimation process 114*b* to the policy manager 90 by the coefficient exceeds the threshold value is satisfied.

Then, when it is determined that the corrected predicted value exceeds the threshold value at a part or all of the plurality of prediction time points, the scale-out executor may execute scale-out the element forming a part or all of the user plane included in the communication system 1.

As another example, the policy manager 90 may determine whether or not the magnitude of a corrected predicted value obtained by multiplying the predicted value of the network load of the user plane included in the communication system 1 by the determined coefficient satisfies a given condition.

For example, the policy manager 90 may determine whether or not the magnitude of the corrected predicted value obtained by multiplying the predicted value indicated by the estimation result data output from the estimation process 114*b* to the policy manager 90 by the coefficient satisfies a given condition.

Further, when, in the determinations of each of two or more prediction periods which have different reference time points but at least partially overlap, a predetermined number or more of the determinations are a determination that the given condition is satisfied, the scale-out executor may execute scale-out of the element forming a part of all of the user plane included in the communication system 1.

It is conceivable that there is a certain degree of correlation between the network load of the control plane and the network load of the user plane. For example, when the network load of the control plane increases, it is highly likely that the network load of the user plane also increases shortly thereafter.

Through setting of the threshold value and coefficient described above to values corresponding to the magnitude of the predicted value of the network load of the control plane, scale-out can be executed on the element forming a part or all of the user plane in consideration of the above-mentioned correlation.

For example, it is possible to execute scale-out more conservatively than usual (that is, execute scale-out even when the predicted value of the network load of the user plane is not so high).

A larger value may be determined as the threshold value as the network load of the control plane becomes higher. Further, a smaller value may be determined as the value of the coefficient as the network load of the control plane becomes higher.

Figure 17:
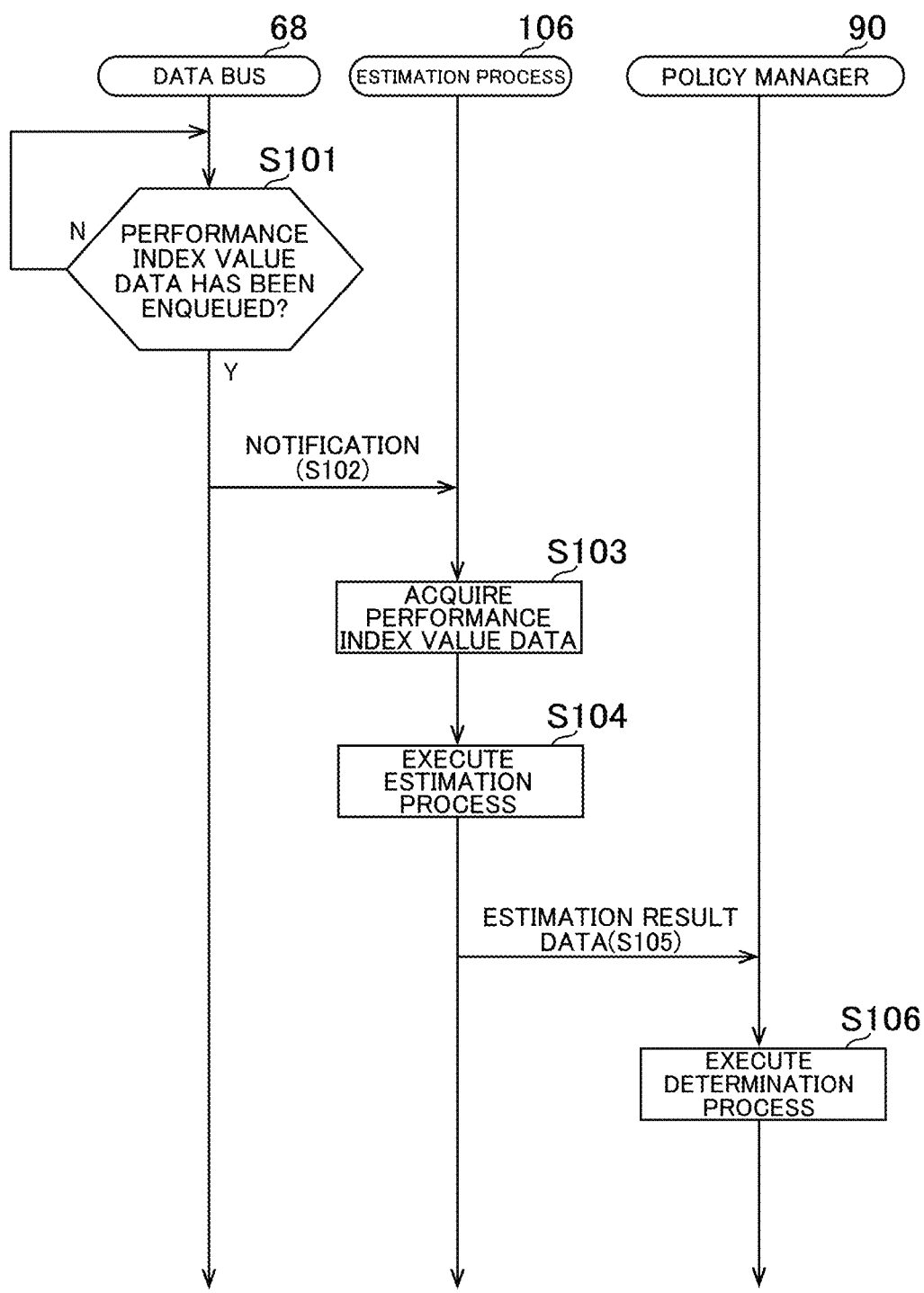
FIG. 17 is a flow chart for illustrating an example of a flow of a process performed by the platform system in the one embodiment of the present invention.

Now, an example of a flow of a process relating to the determination of the status of the communication system 1 performed by the platform system 30 in this embodiment is described with reference to a flow chart exemplified in FIG. 17.

In this process example, the data bus 68 monitors enqueuing of performance index value data for each queue 100 included in the first queue group 102*a* (Step S101).

When the enqueuing of performance index value data in a queue 100 is detected, the data bus 68 outputs, to the estimation process 106 linked to the queue 100, a notification indicating that performance index value data has been enqueued (Step S102).

When the estimation process 106 receives the notification, the estimation process 106 acquires a predetermined number of most recent pieces of the performance index value data or the performance index value data of a most recent predetermined period including the latest performance index value data stored in the queue (Step S103).

Then, the estimation process 106 executes a predetermined estimation process based on the performance index value data acquired in the process step of Step S103, and generates estimation result data (Step S104).

Then, the estimation process 106 outputs the estimation result data generated in the process step of Step S104 to the policy manager 90 (Step S105).

The policy manager 90 receives the estimation result data, and executes a determination process based on the estimation result (Step S106).

In this process example, for example, the process steps of Step S102 to Step S105 are executed in response to the performance index value data being enqueued in a queue 100 included in the first queue group 102a.

Figure 18:
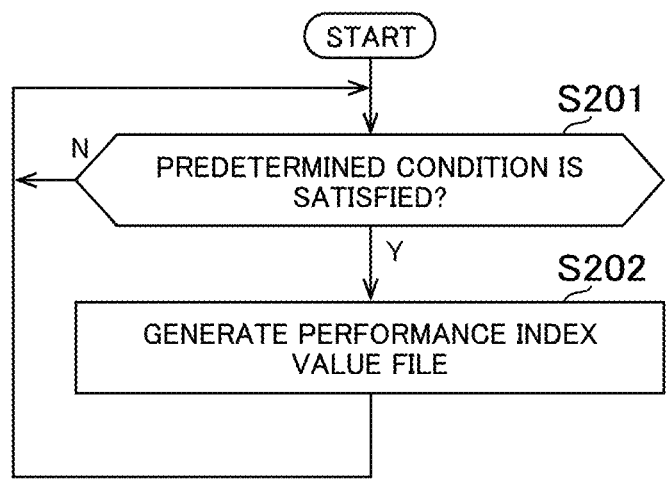
FIG. 18 is a flow chart for illustrating an example of a flow of a process performed by the platform system in the one embodiment of the present invention.

Next, an example of a flow of a process relating to the generation of the performance index value file relating to the first queue group 102a performed by the platform system 30 in this embodiment is described with reference to a flow chart exemplified in FIG. 18.

The data bus 68 stands by for any one of the queues 100 included in the first queue group 102a to satisfy a predetermined condition (Step S201).

When a certain queue 100 satisfies the predetermined condition, the data bus 68 generates a performance index value file including at least a part of the performance index value data stored in the queue 100 (Step S202), and the process returns to Step S201.

Figure 19:
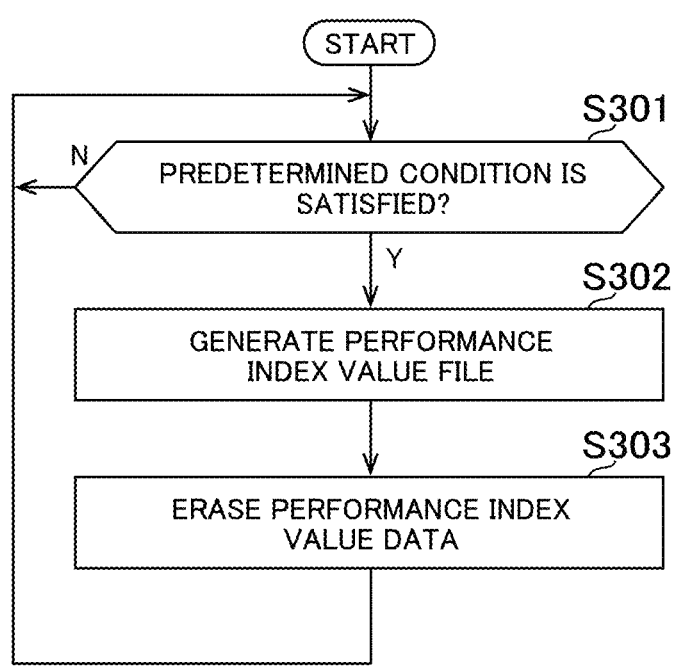
FIG. 19 is a flow chart for illustrating an example of a flow of a process performed by the platform system in the one embodiment of the present invention.

Next, an example of a flow of a process relating to the generation of the performance index value file relating to the second queue group 102b performed by the platform system 30 in this embodiment is described with reference to a flow chart exemplified in FIG. 19.

The data bus 68 stands by for any one of the queues 100 included second queue group 102b to satisfy a predetermined condition (Step S301).

When a certain queue 100 satisfies the predetermined condition, the data bus 68 generates a performance index value file including at least a part of the performance index value data stored in the queue 100 (Step S302).

Then, the data bus 68 erases from the queue 100 all the performance index value data stored in the queue 100 (Step S303), and the process returns to the process step of Step S301.

In the process step of Step S303, the data bus 68 may erase all the performance index value data stored in the queue 100 from the queue 100 by dequeuing all the performance index value data stored in the queue 100.

Further, in this process example, the data bus 68 may erase all the performance index value data stored in the queue 100 by dequeuing, and then generate a performance index value file based on the dequeued performance index value data.

Figure 20:
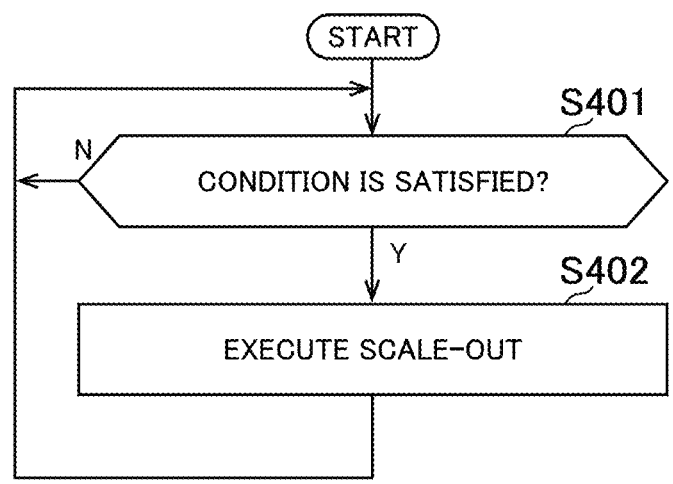
FIG. 20 is a flow chart for illustrating an example of a flow of a process performed by the platform system in the one embodiment of the present invention.

An example of a flow of the above-mentioned determination process illustrated in Step S106 and a process relating to execution of scale-out following the determination process is now described with reference to a flow chart exemplified in FIG. 20.

First, the policy manager 90 determines whether or not the given condition is satisfied at predetermined time intervals (for example, every minute) (Step S401).

Then, when the given condition is satisfied, the scale-out executor executes scale-out (Step S402).

Figure 21:
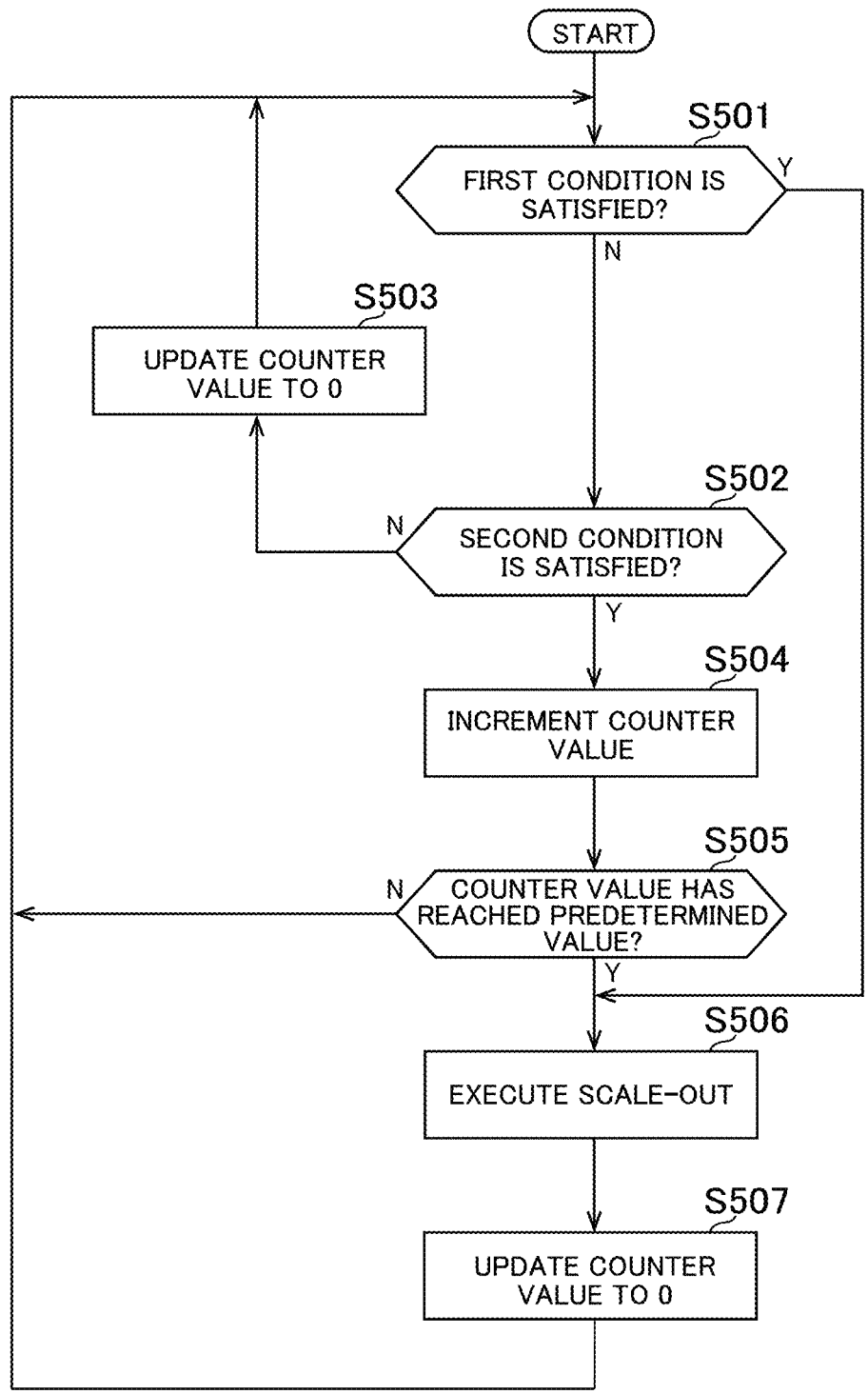
FIG. 21 is a flow chart for illustrating an example of a flow of a process performed by the platform system in the one embodiment of the present invention.

Another example of a flow of the above-mentioned determination process illustrated in Step S106 and a process relating to execution of scale-out following the determination process is now described with reference to a flow chart exemplified in FIG. 21. The process illustrated in FIG. 21 is executed at, for example, predetermined time intervals (for example, every minute). Further, in this process example, it is assumed that the policy manager 90 holds a counter value, and that the initial value of the counter value is 0.

First, the policy manager 90 determines whether or not a given first condition is satisfied (Step S501). As an example of the first condition, the condition that "the predicted value of the traffic amount exceeds the predetermined threshold value th1 in the first period" can be given.

When it is determined that the first condition is not satisfied ("N" in Step S501), the policy manager 90 determines whether or not a given second condition is satisfied (Step S502). As an example of the second condition, the condition that "the predicted value of the traffic amount exceeds the predetermined threshold value th1 in the second period" can be given.

When it is determined that the second condition is not satisfied ("N" in Step S502), the policy manager 90 updates the held counter value to 0 (Step S503), and the process returns to the process step of Step S501.

When it is determined that the second condition is satisfied ("Y" in Step S502), the policy manager 90 increments the held counter value by 1 (Step S504).

Then, the policy manager 90 examines whether or not the held counter value has reached a predetermined value (for example, 3) (Step S505).

When the counter value has not reached the predetermined value ("N" in Step S505), the process returns to the process step of Step S501.

When the counter value has reached the predetermined value ("Y" in Step S505), or when it is determined in the process step of Step S501 that the first condition is satisfied ("Y" in Step S501), the scale-out executor executes scale-out (Step S506). Then, the policy manager 90 updates the held counter value to 0 (Step S507), and the process returns to the process step of Step S501.

It should be noted that the present invention is not limited to the above-mentioned embodiment.

Further, the functional unit in this embodiment is not limited to those illustrated in FIG. 3.

Further, the functional unit in this embodiment is not required to be an NF in 5G. For example, the functional unit in this embodiment may be an eNodeB, a vDU, a vCU, a packet data network gateway (P-GW), a serving gateway (S-GW), a mobility management entity (MME), a home subscriber server (HSS), or another network node in 4G.

Further, the functional unit in this embodiment may be implemented through use of a hypervisor-type or host-type virtualization technology instead of the container-type virtualization technology. Further, the functional unit in this embodiment is not required to be implemented by software, and may be implemented by hardware such as an electronic circuit. Further, the functional unit in this embodiment may be implemented by a combination of an electronic circuit and software.

Further, in this embodiment, the various determination methods (determination processes) described above can be combined in various ways.

The technology disclosed in the present disclosure can also be expressed as follows.

[1] A scale-out execution system including: prediction means for predicting, based on a performance index value before a given reference time point relating to a communication system, a network load in a prediction period from the given reference time point until a predetermined time after the given reference time point; determination means for determining, in response to the prediction, whether a magnitude of a predicted value of the network load in the prediction period satisfies a given condition; and scale-out execution means for executing scale-out of an element included in the communication system when, in the determinations for two or more prediction periods which have different reference time points but at least partially overlap, a predetermined number or more of the determinations are a determination that the given condition is satisfied.

[2] The scale-out execution system according to Item [1], wherein the determination means is configured to determine, at each of a plurality of prediction time points included in the prediction period, whether the predicted value of the network load at the prediction time point exceeds a threshold value, and the scale-out execution means is configured to execute scale-out of the element included in the communication system when, in the determinations for the two or more prediction periods which have different reference time points but at least partially overlap, a predetermined number or more of the determinations are a determination that the predicted value exceeds the threshold value at a part or all of the plurality of prediction time points.

[3] The scale-out execution system according to Item [2], wherein the threshold value is associated with each of the plurality of prediction time points, and increases as a length of time from the given reference time point to the prediction time point increases.

[4] The scale-out execution system according to any one of Items [1] to [3], wherein the scale-out execution means is configured to execute scale-out of the element included in the communication system when, in the determinations for the two or prediction periods which have different reference time more points but at least partially overlap, a predetermined number or more of the determinations are a determination that a magnitude of the predicted value in a period from a first time after the given reference time point until a second time after the given reference time point satisfies a given condition.

[5] The scale-out execution system according to Item [4], wherein the scale-out execution means is configured to execute scale-out of the element included in the communication system in response to, in the determinations for the prediction period, one determination that the magnitude of the predicted value in a period from the given reference time point until the first time after the given reference time point satisfies a given condition.

[6] The scale-out execution system according to any one of Items [1] to [5], wherein the scale-out execution means is configured to execute scale-out of the element included in the communication system in response to, in the determinations for the prediction period, one determination that the magnitude of the predicted value of the network load satisfies a given condition for a period of time having a length equal to or more than a predetermined duration in the prediction period.

[7] The scale-out execution system according to Item [6], wherein the scale-out execution means is configured to execute scale-out of the element included in the communication system in response to, in the determinations for the prediction period, one determination that the magnitude of the predicted value of the network load satisfies a given condition for a period of time having a length equal to or more than a predetermined duration until an end of the prediction period.

[8] The scale-out execution system according to any one of Items [1] to [7], wherein the determination means is configured to determine, in response to the predetermined number or more of the determinations that the given condition is satisfied in the determinations for the two or more prediction periods which have different reference time points but at least partially overlap, whether a trend of a maximum value of the predicted value of the network load satisfies a condition different from the given condition, and the scale-out execution means is configured to execute scale-out of the element included in the communication system in response to a determination that the trend of the maximum value of the predicted value of the network load satisfies the different condition.

[9] The scale-out execution system according to Item [8], wherein the determination means is configured to determine that the different condition is not satisfied when the maximum value of the predicted value of the network load is on a downward trend.

[10] The scale-out execution system according to any one of Items [1] to [9], further including threshold value determination means for determining a threshold value based on a prediction result of a network load of a control plane included in the communication system, and wherein the determination means is configured to determine whether a magnitude of a predicted value of a network load of a user plane included in the communication system exceeds the determined threshold value, and the scale-out execution means is configured to execute scale-out of an element forming a part or all of the user plane included in the communication system when, in the determinations for the two or more prediction periods which have different reference time points but at least partially overlap, a predetermined number or more of the determinations are a determination that the magnitude of the predicted value exceeds the determined threshold value.

[11] The scale-out execution system according to any one of Items [1] to [10], further including coefficient determination means for determining a coefficient based on a prediction result of a network load of a control plane included in the communication system, and wherein the determination means is configured to determine whether a magnitude of a corrected predicted value obtained by multiplying a predicted value of a network load of a user plane included in the communication system by the coefficient satisfies a given condition, and the scale-out execution means is configured to execute scale-out of an element forming a part or all of the user plane included in the communication system when, in the determinations for the two or more prediction periods which have different reference time points but at least partially overlap, a predetermined number or more of the determinations are a determination that the given condition is satisfied.

[12] A scale-out execution method including: predicting, based on a performance index value before a given reference time point relating to a communication system, a network load in a prediction period from the given reference time point until a predetermined time after the given reference time point; determining, in response to the prediction, whether a magnitude of a predicted value of the network load in the prediction period satisfies a given condition; and executing scale-out of an element included in the communication system when, in the determinations for two or more prediction periods which have different reference time points but at least partially overlap, a predetermined number or more of the determinations are a determination that the given condition is satisfied.

The invention claimed is:

1. A scale-out execution system, comprising one or more processors, the scale-out execution system being configured to cause at least one of the one or more processors to execute:
   a prediction process for predicting, based on a performance index value before a given reference time point relating to a communication system, a network load in a prediction period from the given reference time point until a predetermined time after the given reference time point;

a determination process for determining, in response to the prediction, whether a magnitude of a predicted value of the network load in the prediction period satisfies a given condition; and a scale-out execution process for executing scale-out of an element included in the communication system when, in the determinations for two or more prediction periods which have different reference time points but at least partially overlap, a predetermined number or more of the determinations are a determination that the given condition is satisfied.

2. The scale-out execution system according to claim 1, wherein, in the determination process, at each of a plurality of prediction time points included in the prediction period, whether the predicted value of the network load at the prediction time point exceeds a threshold value is determined, and wherein, in the scale-out execution process, scale-out of the element included in the communication system is executed when, in the determinations for the two or more prediction periods which have different reference time points but at least partially overlap, a predetermined number or more of the determinations are a determination that the predicted value exceeds the threshold value at a part or all of the plurality of prediction time points.

3. The scale-out execution system according to claim 2, wherein the threshold value is associated with each of the plurality of prediction time points, and increases as a length of time from the given reference time point to the prediction time point increases.

4. The scale-out execution system according to claim 1, wherein, in the scale-out execution process, scale-out of the element included in the communication system is executed when, in the determinations for the two or more prediction periods which have different reference time points but at least partially overlap, a predetermined number or more of the determinations are a determination that a magnitude of the predicted value in a period from a first time after the given reference time point until a second time after the given reference time point satisfies a given condition.

5. The scale-out execution system according to claim 4, wherein, in the scale-out execution process, scale-out of the element included in the communication system is executed in response to, in the determinations for the prediction period, one determination that the magnitude of the predicted value in a period from the given reference time point until the first time after the given reference time point satisfies a given condition.

6. The scale-out execution system according to claim 1, wherein, in the scale-out execution process, scale-out of the element included in the communication system is executed in response to, in the determinations for the prediction period, one determination that the magnitude of the predicted value of the network load satisfies a given condition for a period of time having a length equal to or more than a predetermined duration in the prediction period.

7. The scale-out execution system according to claim 6, wherein, in the scale-out execution process, scale-out of the element included in the communication system is executed in response to, in the determinations for the prediction period, one determination that the magnitude of the predicted value of the network load satisfies a given condition for a period of time having a length equal to or more than a predetermined duration until an end of the prediction period.

8. The scale-out execution system according to claim 1, wherein, in the determination process, in response to the predetermined number or more of the determinations that the given condition is satisfied in the determinations for the two or more prediction periods which have different reference time points but at least partially overlap, whether a trend of a maximum value of the predicted value of the network load satisfies a condition different from the given condition is determined, and wherein, in the scale-out execution process, scale-out of the element included in the communication system is executed in response to a determination that the trend of the maximum value of the predicted value of the network load satisfies the different condition.

9. The scale-out execution system according to claim 8, wherein, in the determination process, it is determined that the different condition is not satisfied when the maximum value of the predicted value of the network load is on a downward trend.

10. The scale-out execution system according to claim 1, wherein the scale-out execution system is configured to cause the at least one of the one or more processors to execute a threshold value determination process for determining a threshold value based on a prediction result of a network load of a control plane included in the communication system, wherein, in the determination process, whether a magnitude of a predicted value of a network load of a user plane included in the communication system exceeds the determined threshold value is determined, and wherein, in the scale-out execution process, scale-out of an element forming a part or all of the user plane included in the communication system is executed when, in the determinations for the two or more prediction periods which have different reference time points but at least partially overlap, a predetermined number or more of the determinations are a determination that the magnitude of the predicted value exceeds the determined threshold value.

11. The scale-out execution system according to claim 1, wherein the scale-out execution system is configured to cause the at least one of the one or more processors to execute a coefficient determination process for determining a coefficient based on a prediction result of a network load of a control plane included in the communication system, wherein, in the determination process, whether a magnitude of a corrected predicted value obtained by multiplying a predicted value of a network load of a user plane included in the communication system by the coefficient satisfies a given condition is determined, and wherein, in the scale-out execution process, scale-out of an element forming a part or all of the user plane included in the communication system is executed when, in the determinations for the two or more prediction periods which have different reference time points but at least partially overlap, a predetermined number or more of the determinations are a determination that the given condition is satisfied.

12. A scale-out execution method, comprising:

predicting, based on a performance index value before a given reference time point relating to a communication system, a network load in a prediction period from the given reference time point until a predetermined time after the given reference time point;

determining, in response to the prediction, whether a magnitude of a predicted value of the network load in the prediction period satisfies a given condition; and executing scale-out of an element included in the communication system when, in the determinations for two or more prediction periods which have different reference time points but at least partially overlap, a predetermined number or more of the determinations are a determination that the given condition is satisfied.

* * * * *